INVENTORS.
R.F. ALBRIGHTON
AND N.B. COLEY
BY Forest B. Hitchcock
THEIR ATTORNEY

CODE COMMUNICATION SYSTEM

Filed July 11, 1955

INVENTORS.
R. F. ALBRIGHTON
AND N. B. COLEY
BY [signature]
THEIR ATTORNEY

INVENTORS.
R. F. ALBRIGHTON
AND N. B. COLEY
BY Forest B. Hitchcock
THEIR ATTORNEY INVENTORS.
R. F. ALBRIGHTON
AND N. B. COLEY
BY Forest B. Hitchcock
THEIR ATTORNEY INVENTORS
R.F. ALBRIGHTON
AND N.B. COLEY
BY Forest B. Hitchcock
THEIR ATTORNEY

United States Patent Office 2,802,199

Patented Aug. 6, 1957

2,802,199

CODE COMMUNICATION SYSTEM

Reginald F. Albrighton and Nelson B. Coley, Rochester, N. Y., assignors to General Railway Signal Company, Rochester, N. Y.

Application July 11, 1955, Serial No. 521,116

12 Claims. (Cl. 340—163)

This invention relates to code communication systems and it more particularly pertains to railway code communication signaling systems. Furthermore, the present invention relates to means for automatically transferring from normally-used to standby code communication apparatus when apparatus and/or line failures occur.

The use of code communication systems in controlling signaling devices from remote control offices is well-known in the art. Control code characters selected at a control office by manually operable control means are transmitted to field stations having apparatus for controlling nearby signaling devices. Similarly, indication code characters selected at field stations by apparatus which indicates conditions of signaling devices are transmitted to the control office where various indicating devices are actuated in response to the indication codes. Control codes and indication codes are usually transmitted in cycles, each cycle comprising a series of codes. Respective code characters are associated with particular control functions and indication functions.

Code transmission is performed in a number of ways. Each transmission cycle may consist of a number of code steps, each step being allotted a particular length of time during which a code character is transmitted. In general, a code character is formed by selectively applying an energy pulse to a line circuit. Depending on the type of code communication system employed, particular code characters may be distinguished by the presence, absence, polarity or frequency of energy applied to the line circuit during the associated code steps.

In so-called carrier type systems, code characters are identified by the frequencies of energy applied to the line circuits. Since such systems employ electronic transmitters and receivers for transmitting and receiving energies of particular frequencies, it is desirable to provide standby equipment for use whenever apparatus failures occur.

Formation of series of code steps is usually accomplished by means of banks of stepping relays which perform cyclical operations when activated. The number of steps formed during each operating cycle is dependent upon the number of stepping relays employed. It is often desirable to employ a bank of stepping relays capable of forming a particular number of steps during an operating cycle, and to employ cycle counting relays which permit several operating cycles to occur. The cycle counting relays differentiate between particular operating cycles and are therefore capable of conditioning circuits so that the number of steps available is a multiple of the basic number of steps provided during a single operating cycle. In general, the use of cycle counting means renders particular steps unavailable for the transmission of codes because time is required for operating the counting relays either at the end of one stepping cycle or at the beginning of another. For testing purposes it is often desirable to provide manual means for causing such stepping relays to perform operating cycles in which cyclical progress from step to step is dependent upon operation of the manual means. In other words, each actuation of a manual stepping lever, for example, causes the stepping relays to operate, advancing the stepping cycle through one step.

In view of the preceding considerations the present invention provides stepping means wherein a particular number of stepping relays are employed in conjunction with cycle counting relays which multiply the basic number of steps formed by the stepping relays. The operation of the cycle counting relays is such that they are conditioned at times when their use in code transmission networks is not required, thereby permitting the use of all steps in code transmitting operations.

The present invention also provides automatic means for transferring from one group of code transmitting and receiving apparatus to a standby group whenever apparatus failures occur. Furthermore, the present invention provides timing means for causing successive transfers from one apparatus group to another until an operable group is found and placed in operation. The proposed automatic transfer means is applicable, for example, to systems wherein one code communication system is provided for transmitting control codes and another is provided for transmitting indication codes. The two code communication systems each include stepping means, code transmitters and receivers, and apparatus transfer means.

The present invention, in one form, assumes that when the control code and indication code communication systems are at rest various transmitters and receivers are operative and energy is normally transmitted in both directions over respective communication channels.

The failure of a control code transmitter, for example, resulting in the deenergization of an associated communication channel, causes abnormal deenergization of a relay at the field station, which causes transfer means to operate and activates a timing device. The transfer means at the field station removes from service the control code receiver and indication code transmitter being used at the field station and places a standby transmitter and a standby receiver in service. During the transfer operation, the indication code communication system is rendered inactive, resulting in the deenergization of relays associated with the indication code receivers at the control office. Similar transfer means and timing devices are activated at the control office, causing a transfer which places a standby transmitter and a standby receiver in service. Thus, apparatus failure of any transmitter or receiver causes the placing of all standby units in service.

If, after a transfer takes place, any line relays associated with the various receivers cannot be energized before the timers complete their operation, thus indicating a failure in the standby apparatus, another transfer is effected to remove the standby apparatus from service and place the previously used apparatus back into service. Successive transfers occur until the timing devices can be cut off at the end of a transfer operation. The cutting off of timing devices is dependent upon the resumed transmission of energy in both directions and reception by the code communication system.

The transfer means of the present invention includes time delay means which prevents the transfer means from becoming effective in response to short periods of deenergization during the transmission of codes. In other words, during a control code cycle one or more line relays associated with control code receivers may be deenergized because particular code characters do not require their energization. Timing delay is included in the transfer means capable of holding the transfer means ineffective for a period of time at least equal to the transmission time required for a complete code cycle.

The present invention includes manually operable test means, or hand-stepping means, of the type previously described. Since the time required for a hand-stepping operation may be longer than the time delay provided by the time delay means included in the transfer means, circuit means is provided to preclude transfer operations during testing periods.

An object of this invention is to provide a step forming means which includes a bank of stepping relays along with cycle counting relays capable of detecting each cycle of operation by the stepping relays, the cooperative operations of the stepping relays and cycle counting relays being such that all steps are available for use in code transmission.

Another object of the present invention is to provide automatic transfer means for removing faulty code communication apparatus from service and for placing standby apparatus into service.

Another object of this invention is to provide transfer means of the type described which is ineffective during code transmission cycle times.

Another object of this invention is to provide transfer means of the type described along with circuit means for rendering the transfer means inactive during hand-stepping operations.

A further object of this invention is to provide transfer means of the type described and timing means for causing repeated transfer operations until usable code communication apparatus is placed in service.

Other objects, purposes and characteristic features of the present invention will be in part obvious from the accompanying drawings, and in part pointed out as the description of the invention progresses.

In describing the present invention in detail, reference will be made to the accompanying drawings in which:

Figs. 1A–1D when arranged according to Fig. 2 are schematic circuit diagrams showing in one form a code communication system in conjunction with the transfer means and related timing means embodied in this invention;

Figure 1A:
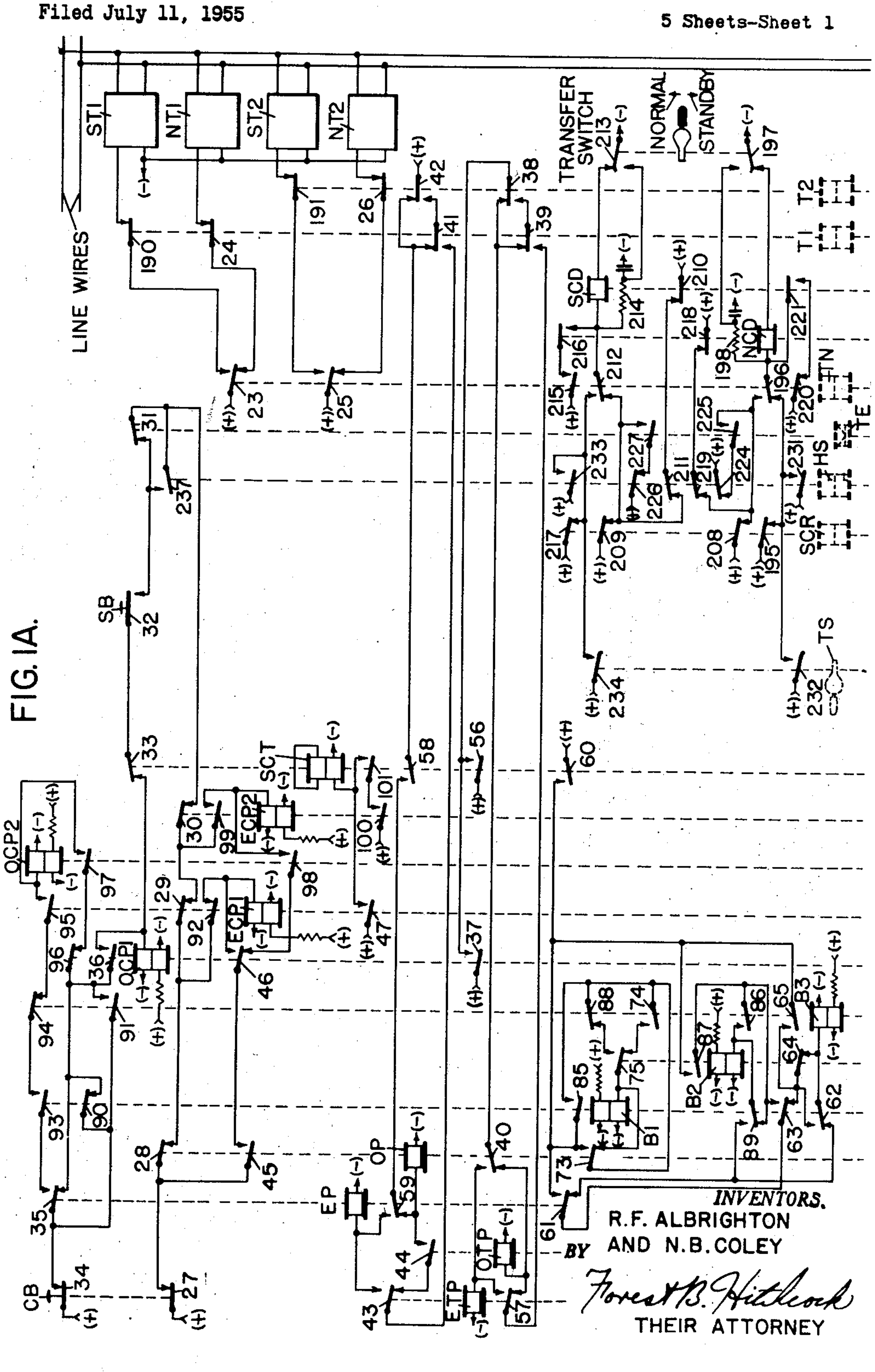

For the purpose of simplifying the illustrations and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (−) are employed to indicate the positive and negative terminals respectively of suitable batteries, or other sources of direct current; and the circuits with which these symbols are used, always have current flowing in the same direction. The symbols (B+) and (B−) indicate connections to the opposite terminals of a suitable battery, or other direct current source which has a central or intermediate tap designated (CN); and the circuit with which these symbols are used may have current flowing in one direction or the other depending upon the particular terminal used in combination with the intermediate tap (CN).

In describing the present invention it is provided that signaling devices at a railway interlocking are controlled from a remote control office. Control codes are transmitted from the control office via a code communication system to a field station substantially at the railway interlocking.

It is further provided that two sets of communication apparatus are employed. One set of code communication apparatus is used for transmitting control codes from the control office to the field station; and the other set of code communication apparatus is used for transmitting indication codes from the field station to the control office. Control code receiving devices at the field station selectively operate the signaling devices at the interlocking. Indication devices at the field station which detect route and traffic conditions effect the transmission of indication codes to receiving devices at the control office. The two sets of code communication apparatus operate substantially independent of each other normally, and operation of the two sets of apparatus may occur simultaneously.

CONTROL CODE TRANSMITTING APPARATUS

The signaling devices at the railway interlocking are selectively controlled from a control panel (not shown) located in the control office. The control panel may be of any of a number of well known types commonly employed in centralized traffic control systems. The control panel is assumed to include a miniature track diagram corresponding to the physical layout of the railway interlocking. Various levers for controlling particular track switches and signals are located in the track diagram at points corresponding to actual track switch and signal locations. Control levers of this type are shown schematically in Fig. 1B and will be described later in greater detail.

It is further assumed that indication lights and other devices for indicating route and traffic conditions are provided on the control panel; although the circuit drawings do not in general make reference to such devices. Suitable levers or push buttons are provided on the control panel for actuating the control code communication apparatus. A starting button SB (see Fig. 1A) is provided for activating the control code communication system; and a cancel button CB is provided for stopping the operation of the control code communication system at any time. In addition, a recheck button RB is provided for causing the indication code communication system to be activated, resulting in the transmission of indication code cycles.

Assuming that the control code communication system may be actuated manually, a test switch TS and a hand-step switch HSS are provided. The test switch TS is used for selecting the mode of operation of the code communication system; operation of the test switch to one position permits automatic operation of the system, while operation of the test switch to a second position permits hand-step operations. When the test switch is properly positioned the hand-step switch HSS may be operated to cause the system to operate in an interrupted step-by-step manner.

Code characters are assumed to consist of energy pulses applied to a line circuit by code transmitters. The code transmitters are assumed to be capable of transmitting energies having distinctive frequencies of oscillation. In Fig. 1A, two normally operative transmitters NT1 and NT2 are shown. The output energy supplied by the transmitter NT1 is assumed to have a particular frequency of oscillation which differs from the frequency of oscillation of the output energy supplied by the second transmitter NT2. Standby transmitters ST1 and ST2 are provided for use whenever a failure occurs in the normally used transmitters NT1 and NT2; the transmitters NT1 and ST1 have similar output frequencies as do the transmitters NT2 and ST2.

The transmitters NT1 and NT2 (or ST1 and ST2) are controlled by transmitter control relays T1 and T2, respectively. The transmitter control relays T1 and T2 are selectively energized by a stepping network to be described and cause the activation of their associated transmitters.

A bank of stepping relays B1, B2 and B3 is provided to perform a cyclical stepping operation. The stepping relays operate in the manner peculiar to Gray counters, the operation of which will be described later. During an operating cycle relays B1, B2 and B3 may be either energized or deenergized at any given time. Therefore eight distinct permutations of relative relay conditions may be obtained resulting in the formation of eight code steps by the contact alignments of the relays.

In order to increase the number of steps which may be provided by the stepping relays, cycle counting relays OCP1, ECP1, OCP2 and ECP2 are provided. Relays OCP1 and ECP1 are assumed to be energized during the first cycle of operation by the stepping relays. Relays OCP2 and ECP2 are energized during the second cycle of stepping relay operation. In this manner, the number of code steps made available by the stepping relays is doubled. It is evident that the use of additional cycle counting relays will increase the step capacity of the system in multiples of eight. The relays OCP1 and OCP2 are associated with odd-numbered steps in particular cycles while relays ECP1 and ECP2 are associated with even-numbered steps. Each cycle counting relay and stepping relay is assumed to be quick acting in picking up its armature, a sufficient level of energization being maintained constantly on the lower winding of each relay for this purpose.

Figure 1B:
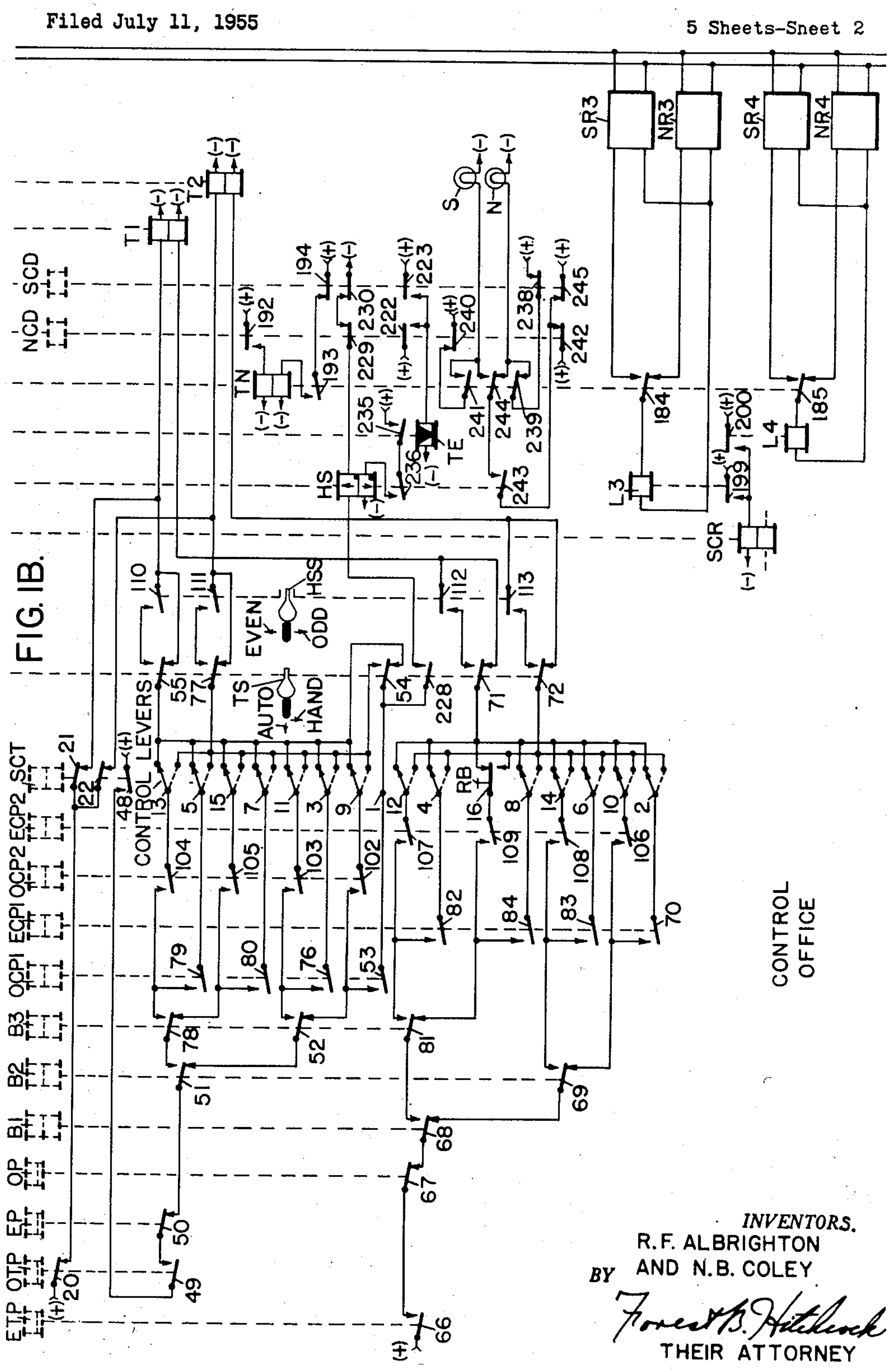

Contacts of the stepping relays B1, B2, B3 and the cycle counting relays OCP1, ECP1, OCP2 and ECP2 form control networks shown in Fig. 1B. The reference characters 1–16 identify the sixteen steps which may be formed and further identify the control levers associated with the steps.

Two pulse spacing relays EP and OP are provided to actuate the stepping relays B1, B2 and B3 and to determine the length of time which must elapse between successive steps. The relays EP and OP are actuated in response to operations of the transmitter control relays T1 and T2 in a manner to be described. It is assumed that the relays EP and OP are of the slow-release type, the release times of the relays determining the spacing between successive code pulses. Relay EP is associated with even-numbered steps, while relay OP is associated with odd-numbered steps.

Two pulse timing relays ETP and OTP are provided to determine the pulse lengths of control codes transmitted. The relays ETP and OTP are actuated alternately in response to operations of the transmitter control relays T1 and T2; relay ETP is associated with even-numbered code steps, while relay OTP is associated with odd-numbered steps. The relays ETP and OTP are assumed to be slow-acting; and their release times govern the lengths of particular code pulses.

A start cycle relay SCT is provided for activating the code communication system. The relay SCT is energized at the start of each control code cycle and remains energized until the completion of the cycle.

CONTROL CODE RECEIVING APPARATUS

Figures 1C, 2:
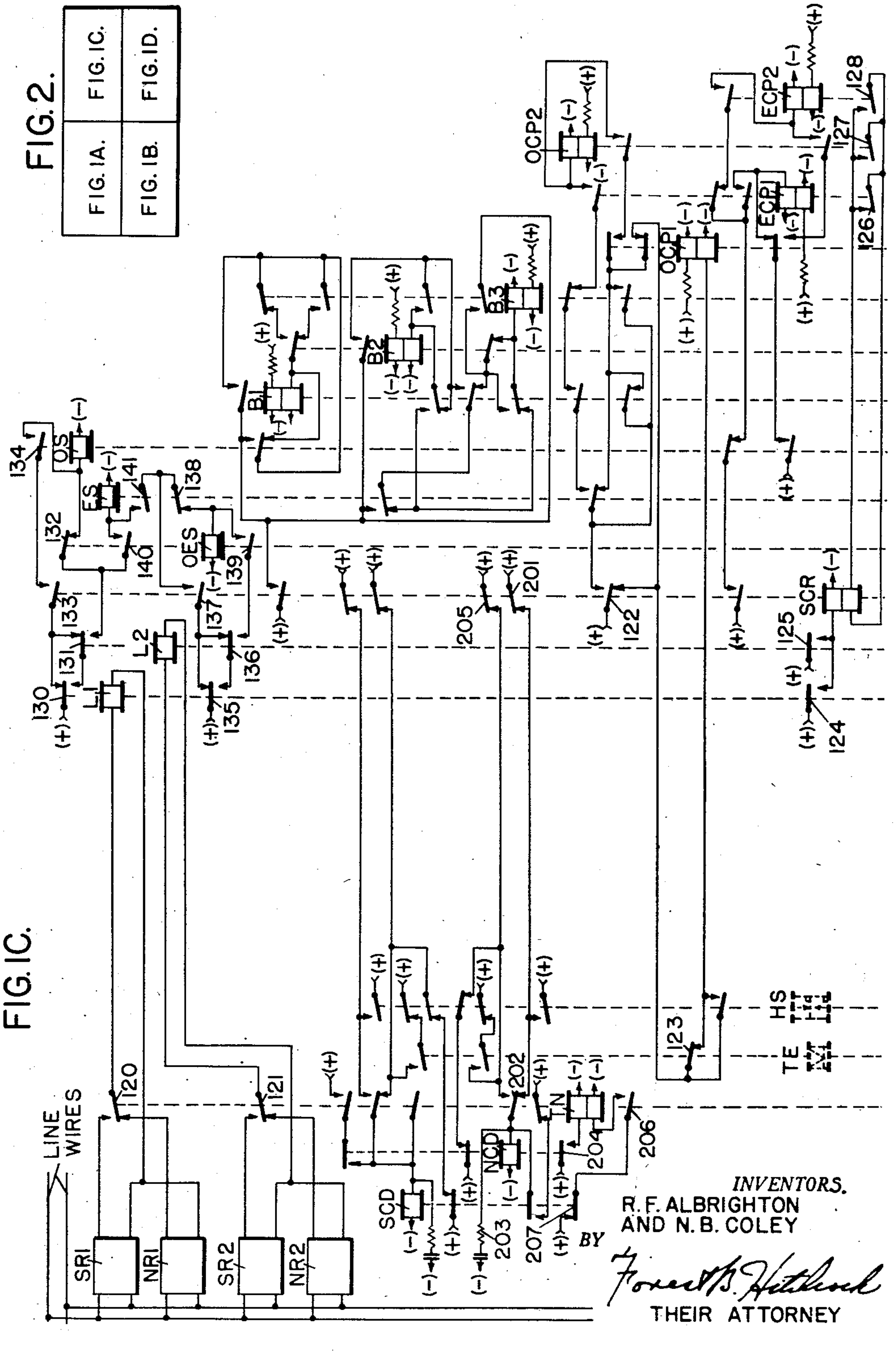
Fig. 2 shows the manner in which Figs. 1A–1D must be placed in relationship to each other to present a complete system.
Figures 1D, 3:
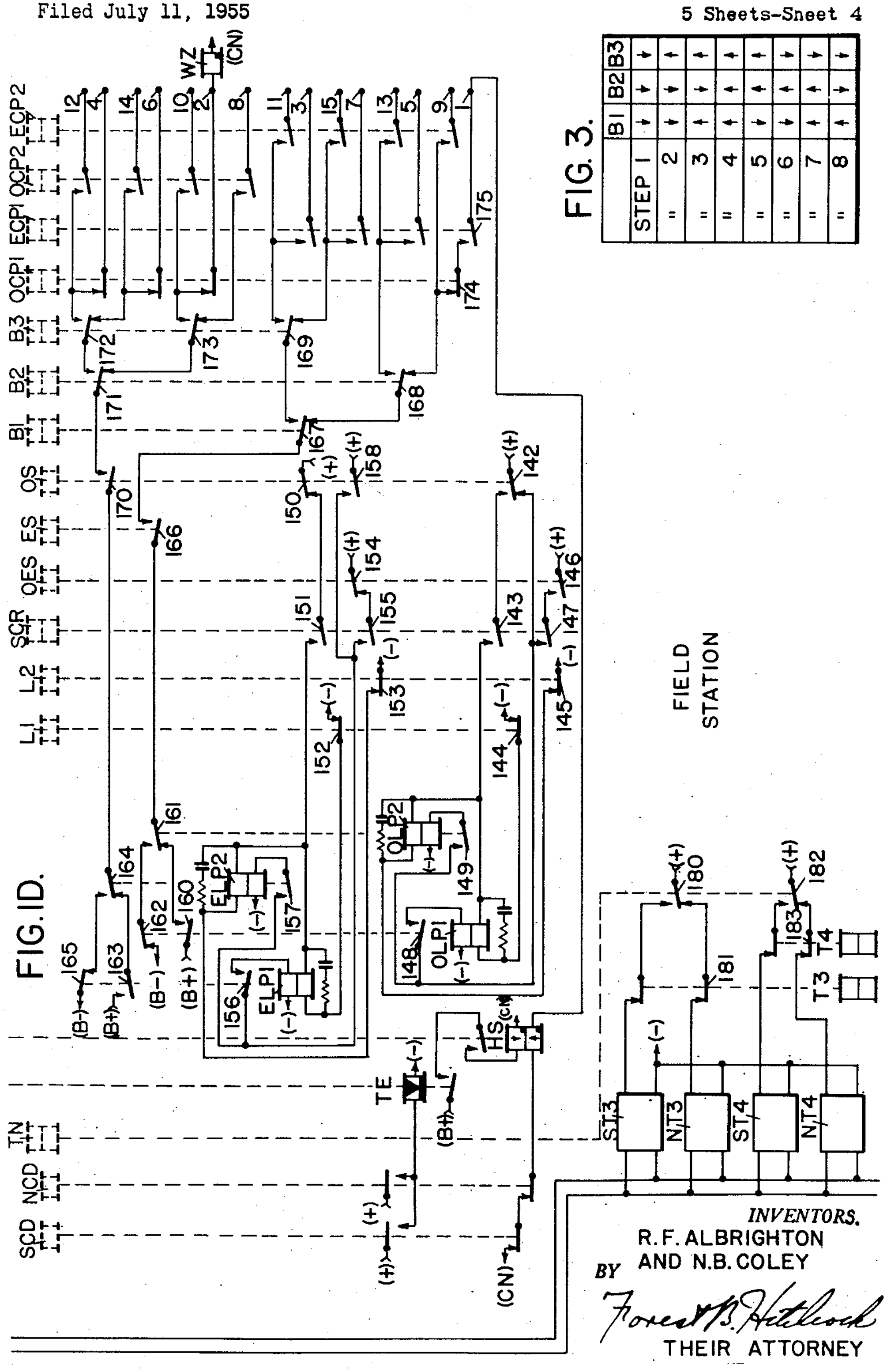
Fig. 3 is a table showing the sequence of operation of stepping relays during each cycle of operation by such relays.

In Figs. 1C and 1D control code receiving apparatus located in the field station are shown.

Two normally operative code receivers NR1 and NR2 are shown connected to the line circuit. Each of the receivers NR1 and NR2 is responsive to energy pulses having frequencies identical to those transmitted by the code transmitters NT1 and NT2 respectively. In case of failure standby receivers SR1 and SR2 are provided for replacing receivers NR1 and NR2 respectively in the operating circuits. Two line relays L1 and L2 are provided for responding to the reception of control codes by the receivers NR1 and NR2 (or SR1 and SR2), respectively.

A bank of stepping relays B1, B2 and B3 is provided to provide a coded stepping means similar to that described for the control office.

The stepping relays B1, B2 and B3 are actuated by step pulse relays ES and OS which are provided to respond, alternately, on even and odd-numbered code transmission steps respectively, to operations of the line relays L1 and L2. The step pulse relays are assumed to be of the slow-release type; and their release times determine the periods of time during which particular control steps are effective in the field station circuits.

A step pulse repeater relay OES is provided to operate the step pulse relays ES and OS alternately. The relay OES is responsive to operations of the line relays L1 and L2 and the step pulse relays ES and OS.

Cycle counting relays OCP1, ECP1, OCP2 and ECP2 are provided to count operating cycles performed by the stepping relays B1, B2 and B3. The operation of the cycle counting relays is identical to that described for similar relays in the control office.

Four line repeater relays OLP1, ELP1, OLP2 and ELP2 are provided for detecting operations of the line relays L1 and L2 on particular code steps. Relays ELP1 and OLP1 are responsive to operations of the line relay L1 which occur during even-numbered and odd-numbered steps, respectively. Similarly, relays ELP2 and OLP2 respond to operations of the line relay L2 on even-numbered and odd-numbered steps, respectively. Each line repeater relay is provided with stick circuit means to maintain energization of the relay for a period longer than that allotted to the incoming energy pulse which activates the associated line relay. In this manner particular control codes are stored for a length of time sufficient to permit the selective controlling of signaling devices.

A cycle starting relay SCR is provided for starting cyclical operations of the control receiving apparatus. This relay is similar to relay SCT described in the control office. The relay SCR is actuated by the relays L1 and L2 at the start of each control cycle and remains energized for the duration of each cycle.

INDICATION CODE APPARATUS

The indication code transmitting and receiving apparatus is assumed to be identical to that described for the control code system. The indication code transmitting apparatus is located in the field station as shown in Fig. 1D. Similarly, the indication code receiving apparatus is located in the control office as shown in Fig. 1B. In both Figs. 1B and 1D only portions of the indication code system are shown, such portions being sufficient for use in describing the entire code communication system operation.

In Fig. 1D two normally operative code transmitters NT3 and NT4 along with standby code transmitters ST3 and ST4 are shown controlled by transmitter control relays T3 and T4. The indication code transmitters are assumed to differ from the previously described control code transmitters only insofar as output energy frequencies are concerned. In other words, the frequencies of the output energies from the transmitters NT3 and NT4 (or ST3 and ST4) are assumed to differ from each other and from the output frequencies of the control code transmitters NT1 and NT2 (or ST1 and ST2). The transmitter control relays T3 and T4 are identical to relays T1 and T2 previously described.

It is assumed that hand stepping operations may be performed by the indication code system. For this purpose a test switch TS and a hand-step switch HSS are assumed to be provided on a panel at the field station, the switches being identical to those described for the control code system. The mode of operation of the indication code system differs in that the starting push button SB and the cancellation button CB described for the control code system are omitted. The functions of the starting button SB are duplicated by a suitable relay or other device which operates in response to changes in the conditions of signaling devices.

In Fig. 1B the normally operative indication code receivers NR3 and NR4 along with standby receivers SR3 and SR4 are provided for detecting energies of particular frequencies which are transmitted by the indication code transmitters NT3 and NT4 (or ST3 and ST4) respectively. Two line relays L3 and L4 are provided to respond to actuations of the receivers NR3 and NR4 (or SR3 and SR4), respectively. The receivers, line relays and start cycle relay SCR are assumed to function in the manner previously described for the relays L1, L2 and SCR respectively at the field station. Furthermore, it is assumed that the control code receiving relays previously described are duplicated by similar devices in the control office for responding to the indication codes.

The essential difference between the control code system and the indication code system is the substitution of indication devices for control levers in the indication code system. Furthermore, code responsive indication devices are provided at the receiving end of the indication code system whereas code responsive control devices are provided at the receiving end of the control code system.

TRANSFER APPARATUS

In order to effect a transfer from normally-used to standby apparatus in the event of a failure two identical sets of transfer devices are provided, one set being located in the control office and the other at the field station. In the control office a normal cycle detection relay NCD and a standby cycle detection relay SCD are provided for detecting the failure of normally-used and standby transmitting or receiving devices, respectively. The relays NCD and SCD are normally energized by circuits to be described later. At the start of a code cycle the energizing circuits for one or the other of the two relays are opened. The relays NCD and SCD do not release their armatures immediately, however, because of capacitor units which are connected electrically in parallel with each relay winding. The electrical values of the capacitor units and the relay windings are adjusted so that neither relay NCD nor SCD can release its armature until a period of time equal to a code transmission cycle time has elapsed.

A transfer relay TN is provided to select between normally-used and standby transmitters and receivers. The transfer relay is assumed to be energized whenever standby apparatus is in use. Furthermore, the relay TN is actuated in response to operations by the cycle detection relays NCD and SCD which detect apparatus failures.

A timing relay TE is provided for causing a hunting operation to take place whenever transfers are effected from one faulty set of apparatus to another. In other words, at the start of each transfer operation the timing relay TE is activated. If system operating conditions are not restored before the timing cycle of the relay TE is completed a further transfer is effected to find usable code communication apparatus.

In order to permit hand stepping operations which normally require time intervals considerably greater than cycle transmission times a hand-step relay HS is provided to render the the transfer operations ineffective. The relay HS is assumed to be of the magnetic stick type which retains its armature in the last operated position.

Manual apparatus transfers may be effected by manipulations of a transfer switch which is provided on the control office control panel.

Identical apparatus is provided in the field station, although the providing of a manual transfer switch is optional. The transfer apparatus in the field station is activated whenever a failure occurs in the control code transmission circuits. The transfer apparatus in the control office is rendered effective whenever failures in the indication code transmission circuits are detected. Furthermore, the detection of a failure and the resultant transfer operation at either location results in a complete transfer of all apparatus in both systems.

OPERATION

*Control code transmission*

When the code communication system is at rest, the transmitter control relays T1 and T2 (see Figs. 1A and 1B) are energized. Relay T1 is energized by a pick-up circuit extending from (+), including back contact 20 of relay OTP, back contact 21 of relay SCT, and the upper winding of relay T1, to (−). Relay T2 is energized by a pick-up circuit extending from (+), including back contact 20 of relay OTP, back contact 22 of relay SCT, and the upper winding of relay T2, to (−).

The energized states of relays T1 and T2 result in the activation of the normally used transmitters NT1 and NT2. The transmitter NT1 is energized by a circuit which includes back contact 23 of relay TN and front contact 24 of relay T1. Similarly, the transmitter NT2 is energized by a circuit which includes back contact 25 of relay TN and front contact 26 of relay T2. The transmitters NT1 and NT2, therefore, apply energies having particular frequencies of oscillation to a line circuit.

In initiating the transmission of a control code cycle, the start button SB is actuated which results in the energization of the cycle counting relay OCP1. Relay OCP1 is energized by a pick-up circuit extending from (+), including front contact 27 of the cancel button CB, back contact 28 of relay OP, back contact 29 of relay ECP1, back contact 30 of relay ECP2, back contact 31 of relay TE, contact 32 of the start button SB, back contact 33 of relay SCT, and the upper winding of relay OCP1, to (−). Relay OCP1 is then held energized by a stick circuit extending from (+), including front contact 34 of the cancel button CB, back contact 35 of relay EP, front contact 36 of relay OCP1, and the upper winding of relay OCP1, to (−).

The pulse timing relay OTP is then energized by a pick-up circuit extending from (+), including front contact 37 of relay OCP1, front contact 38 of relay T2 which is in parallel with front contact 39 of relay T1, back contact 40 of relay OP, and the relay winding OTP, to (−). Back contact 20 of relay OTP opens in the previously described pick-up circuits for the transmitter control relays T1 and T2, causing relay T1 and T2 to be deenergized. Contacts 24 and 26 of relays T1 and T2, respectively, open in the previously described energizing circuits for the transmitters NT1 and NT2. Therefore, code energy is removed from the line circuit. Front contacts 38 and 39 of relays T2 and T1, respectively, then open the previously described pick-up circuit for relay OTP. However, relay OTP, being slow acting, does not release its armature before a second pick-up circuit is closed; this pick-up circuit includes back contacts 38 and 39 of relays T2 and T1, respectively, and back contact 57 of relay ETP.

When relays T1 and T2 release their armatures, back contacts 41 and 42 of relays T2 and T1, respectively, close a pick-up circuit for the pulse spacing relay OP; this pick-up circuit also includes back contact 43 of relay ETP and front contact 44 of relay OTP. The subsequent closing of front contact 45 of relay OP closes a pick-up circuit for the cycle counting relay ECP1; the pick-up circuit also includes front contact 27 of the cancel button CB and front contact 46 of the relay OCP1.

The start cycle relay SCT is then energized by a pick-up circuit which includes front contact 47 of relay ECP1. Relay SCT will be held energized until a cycle transmission is completed by a stick circuit to be described later. Front contact 56 of relay SCT closes to provide an additional means for applying energy to the previously described pick-up circuit for relay OTP.

Transmitter control relay T1 is now energized by a pick-up circuit extending from (+), including front contact 48 of relay SCT, front contact 49 of relay OTP, back contact 50 of relay EP, back contact 51 of relay B2, back contact 52 of relay B3, front contact 53 of relay OCP1, back contacts 54 and 55 of the test switch TS, and the upper winding of relay T1, to (−). The subsequent closing of front contact 24 of relay T1 energizes the transmitter NT1 which in turn applies energy to the line circuit. This operation, in effect, productes a code transmission on the first step of a control code cycle. The opening of back contact 41 of relay T1 in the previously described pick-up circuit for relay OP removes energy from the relay winding. The slow release characteristics of relay OP, however, cause the relay to retain its armature until a second pick-up circuit for the relay is closed; this pick-up circuit includes back contact 42 of relay T2, front contact 41 of relay T1, front contact 58 of relay SCT, and back contact 59 of relay EP.

Relay ETP is now energized by a pick-up circuit which includes front contact 37 of relay OCP1, back contact 38 of relay T2, front contact 39 of relay T1, and front contact 40 of relay OP. Back contact 40 of relay OP is now open in one of the energizing circuits for realy OTP; and the subsequent opening of back contact 57 of relay ETP opens the other previously described energizing circuit for relay OTP. Relay OTP, however, does not release its armature immediately because of the slow-release characteristics of the relay. Until relay OTP releases its armature, the transmitter control relay T1 is held energized by the pick-up circuit which includes front contact 49 of relay OTP. When the front contact 49 of relay OTP opens, relay T1 is deenergized resulting in the deenergization of the transmitter NT1 by the opening of front contact 24 of relay T1. The deenergization of transmitter NT1 effectively ends the code transmission on the first step in a code transmission cycle.

When back contact 41 of relay T1 closes, relay EP is energized by a pick-up circuit which also includes back contact 42 of relay T2 and front contact 43 of relay ETP. The subsequent opening of back contact 59 of relay EP deenergizes relay OP. Relay OP does not, however, release its armature because of its slow-acting characteristics.

When relay OP releases its armature the stepping relay B3 is energized by a pick-up circuit extending from (+), including front contact 60 of relay SCT, front contact 61 of relay EP, back contact 63 of relay B1, back contact 64 of relay B2, and the upper winding of relay B3, to (−). A stick circuit for relay B3 is provided and includes front contact 60 of relay SCT, front contact 65 of relay B3, and back contact 64 of relay B2.

When the back contacts of the previously deenergized relay OP close, a pick-up circuit for the transmitter control relay T1 is established. This pick-up circuit includes front contact 66 of relay ETP, back contact 67 of relay OP, back contact 68 of relay B1, back contact 69 of relay B2, front contact 70 of relay ECP1, a contact of control lever 2 closed in the upper position, back contact 71 of the test switch TS and the lower winding of the relay T1. It can be noted here that if the contact of control lever 2 were closed in the lower position relay T2 would be energized instead of relay T1. Such a pick-up circuit is identical to that described previously but includes back contact 72 of the test switch TS. The positions assumed by the various control levers are, therefore, code selection means in that they determine which of the transmitter control relays T1 and T2 is to be energized one each step.

The energization of one or the other of the relays T1 and T2 results in the activation of the associated transmitter NT1 or NT2, respectively. A pulse of energy is applied to the line circuit and represents the second step in a control code cycle.

In order to simplify further circuit description it will be assumed that all control levers are positioned to close their contacts in the upper positions as shown and that relay T1 alone is energized on each control code step; even though in actual system operations either relay T1 or T2 may be energized on a given step.

When front contact 39 of relay T1 closes, relay OTP is energized by the previously described pick-up circuit which also includes back contact 40 of relay OP. At the same time the opening of back contact 39 of relay T1 opens a stick circuit for relay ETP, the pick-up circuit for relay ETP being already open at front contact 40 of relay OP. Relay ETP, being slow acting, does not release its armature until the release time of the relay is exceeded. When relay ETP does release its armature relay T1 is deenergized as the result of the opening of front contact 66 of relay ETP. The transmitter NT1 is then deenergized by the opening of front contact 24 of relay T1. The dropping away of relay T1 and the subsequent deactivation of the transmitter NT1 indicates the end of the second step of the control code cycle.

When relay T1 releases its armature front contact 41 of relay T1 opens and back contact 41 of relay T1 closes. The opening of front contact 41 of relay T1 removes energy from the stick circuit for relay EP, the pick-up circuit for relay EP being already open at front contact 43 of relay ETP. The closing of back contact 41 of relay T1 closes a pick-up circuit for relay OP which includes back contact 43 of relay ETP and front contact 44 of relay OTP.

The stepping relay B1 is now energized by a pick-up circuit extending from (+), including front contact 60 of relay SCT, front contact 73 of relay OP, front contact 74 of relay B3, back contact 75 of relay B2, and the lower winding of relay B1, to (−).

When relay EP closes it back contacts relay T1 is energized by a pick-up circuit which includes front contact 48 of relay SCT, front contact 49 of relay OTP, back contact 50 of relay EP, back contact 51 of relay B2, front contact 52 of relay B3, front contact 76 of relay OCP1, a contact of control lever 3 and back contact 55 of the test switch TS. The energization of relay T1 results in the application of an energy pulse to the line circuit by the transmitter NT1 as previously described. This constitutes the beginning of the third control code step. It can be noted that if the control lever associated with step 3 were positioned to close its contact in the lower position relay T2 would be energized instead of relay T1 by a similar pick-up circuit which includes back contact 77 of the test switch TS.

The energization of relay T1 opens the pick-up circuit for relay OP at back contact 41 of relay T1. However, the subsequent closing of front contact 41 of relay T1 closes the other energizing circuit for relay OP which includes back contact 59 of relay EP.

In view of the overall circuit operation described so far and considering the assumptions that all control levers associated with steps 1–16 are positioned to close their contacts in the upper positions, resulting in energizations of relay T1 only, further description of operation can be simplified by treating various circuit groups individually.

Relay T1 is energized for the duration of each of the control code steps 1–16. Pick-up circuits for relay T1 on steps 1, 2 and 3 have been described. Inspection of the control networks which energizes relay T1 shows that odd-numbered steps are formed in one network while even-numbered steps are formed in the other. The network for odd-numbered steps includes front contact 49 of relay OTP and back contact contact 50 of relay EP. Further selection between steps also made by contacts 51 and 52 of relays B2 and B3, respectively, as previously described;

further selection is introduced by the dependent front-back contact 78 of relay B3. Since the stepping relays B1, B2 and B3 operate in cycles which each comprise eight steps, the odd numbered steps 1, 3, 5 and 7 are included in the first cycle of operation. Steps 1 and 3 are rendered effective when front contacts 53 and 76 respectively of relay OCP1 are closed. Since relay OCP1 is assumed to be energized for the duration of the first cycle of eight steps, front contacts 79 and 80 of relay OCP1 are closed to render steps 5 and 7 respectively effective at later times in a cycle.

Similarly, the even-numbered control steps are dependent upon the condition of front contact 66 of relay ETP and back contact 67 of relay OP. Further selection between steps is made by contact 68 of relay B1, contact 69 of relay B2 and contact 81 of relay B3. In addition, front contacts 70 and 82 and 83 and 84 of relay ECP1 must be closed in the energizing circuits for steps 2, 4, 6 and 8, respectively.

It can be assumed then that the stepping relays B1, B2 and B3 are selectively energized or deenergized to render steps 1 through 8 effective, providing that the pulse time relays ETP and OTP and the pulse spacing relays EP and OP are further selectively actuated to provide a sequence of stepping operations.

Considering now the control circuits for the stepping relays B1, B2 and B3, when the system is initially activated, all of the stepping relays are deenergized. This condition exists at the time when the first control code is transmitted on step 1. At the end of code transmission on step 1 relay OP is deenergized while relay EP is energized. Relay B3 is subsequently energized by a pick-up circuit including front contact 60 of relay SCT, front contact 61 of relay EP, back contact 63 of relay B1, back contact 64 of relay B2 and the upper winding of relay B3. Relay B3 is therefore energized before code transmission begins on step 2.

When code transmission ceases on step 2, relay EP is cut off and relay OP is energized. Front contact 61 of relay EP opens in the pick-up circuit for relay B3; but relay B3 remains energized by a stick circuit which included back contact 64 of relay B2 and front contact 65 of relay B3. Relay B1 becomes energized when front contact 73 of relay OP closes in a circuit which also includes front contact 74 of relay B3 and back contact 75 of relay B2. Thus, relays B1 and B3 are energized before code transmission on step 3 begins.

At the end of code transmission on step 3, relay OP is deenergized while relay EP becomes energized. Relay B3 remains energized by its previously described stick circuit. Front contact 73 of relay OP opens the pick-up circuit for relay B1; but front contact 85 of relay B1 closes to establish a stick circuit for relay B1, the stick circuit also including front contact 74 of relay B3 and back contact 75 of relay B2. Relay B2 becomes energized by a pick-up circuit including front contact 61 of relay EP, front contact 63 of relay B1, front contact 86 of relay B3 and the lower winding of relay B2. Front contact 87 of relay B2 closes a stick circuit, including front contact 86 of relay B3, for relay B2. Back contact 64 of relay B2 opens in the previously described stick circuit for relay B3; but front contact 62 of relay B1 is closed, by-passing back contact 64 of relay B2. Thus, relays B1, B2 and B3 are all energized at the start of step 4.

When code transmission on step 4 terminates, relays EP and OP are respectively deenergized and energized. The opening of back contact 73 of relay OP deenergizes relay B1, since no other circuits are closed to maintain energization of relay B1. More specifically, the open conditions of back contacts 75 and 88 of relays B2 and B3, respectively, prevent continued energization of relay B1 by alternate stick circuits. Relay B2 is held energized by the stick circuit which includes front contacts 86 and 87 of relays B3 and B2 respectively. In the case of relay B3, the opening of front contact 62 of relay B1 opens the stick circuit for relay B3. However, relay B3 is sufficiently slow-acting in releasing its armature to permit back contact 61 of relay EP and back contacts 62 and 63 of relay B1 to close before front contact 65 of relay B3 opens; thus another holding circuit which includes these contacts is closed to maintain energization of relay B3. At the start of code transmission on step 5, therefore, relays B2 and B3 are energized while relay B1 is deenergized.

At the end of code transmission on step 5, relay OP is deenergized while relay EP is energized. Relay B2 is held energized by a stick circuit including front contact 87 of relay B2 and either front contact 86 of relay B3 or back contact 89 of relay B1. Relay B3 is deenergized when back contact 61 of relay EP opens in the energizing circuit which includes back contacts 62 and 63 of relay B1 and front contact 65 of relay B3. Relay B1 remains deenergized because front contact 73 of relay OP opens before back contact 88 of relay B3 can close to provide a pick-up circuit for relay B1. Thus, at the start of code transmission on step 6 relay B2 is energized while relays B1 and B3 are deenergized.

When code transmission ceases during step 6, relay OP is energized while relay EP is deenergized. Relay B1 is energized by its pick-up circuit which includes front contact 73 of relay OP, back contact 88 of relay B3 and front contact 75 of relay B2. Stick contact 85 of relay B1 subsequently closes. Back contact 89 of relay B1 opens the energizing circuit for relay B2. However, relay B2 is sufficiently slow-acting to permit the closure of a holding circuit including front contact 87 of relay B2, front contact 63 of relay B1, back contact 61 of relay EP, front contact 89 of relay B1 and the lower winding of relay B2. Relay B3 remains deenergized because back contact 64 of relay B2 remains open in the pick-up circuit. Thus, at the beginning of code transmission on step 7, relays B1 and B2 are energized while relay B3 is deenergized.

At the end of code transmission on step 7, relay EP is energized while relay OP is deenergized. Relay B2 is deenergized when back contact 61 of relay EP opens in the energizing circuit which includes front contacts 63 and 89 of relay B1 and contact 87 of relay B2. Relay B3 remains deenergized because back contact 63 of relay B1 is open in the pick-up circuit which includes front contact 61 of relay EP and back contact 64 of relay B2. Relay B1 is held energized because it is slow-acting and does not release its armature before back contact 73 of relay OP closes to provide a holding circuit which also includes front contact 85 of relay B1. At the beginning of code transmission on step 8, therefore, relay B1 is energized while relays B2 and B3 are deenergized.

When code transmission ceases during step 8, relay EP is deenergized while relay OP is energized. Back contact 73 of relay OP opens causing the deenergization of relay B1. Relays B2 and B3 cannot be energized because front contact 61 of relay EP is open in the possible pick-up circuits for the relays. Thus, relays B1, B2 and B3 are all deenergized at the end of step 8, this being the initial condition of the relays at the start of an operating cycle. One complete cycle of operation has been performed by the relays, resulting in operations of the various stepping relay contacts previously described in control networks for relays T1 and T2.

In Fig. 3 the operation of the stepping relays is shown in graphic form. Arrows pointing upward indicate relays which are energized for particular steps in each eight-step cycle of operation performed by the relays. Arrows pointing downward indicate relays which are deenergized under similar conditions.

Giving attention now to the operation of the cycle counting relays OCP1, ECP1, OCP2 and ECP2, a pick-up circuit for relay OCP1 has been described which is operative at the beginning of a control code cycle when the start button SB is depressed. Once energized, relay OCP1 is held energized by a stick circuit which includes contact 34 of the cancel button CB, back contact 35 of relay EP, and front contact 36 of relay OCP1. Back contact 90 of relay B1 and front contact 91 of relay B3 are each connected in parallel with back contact 35 of relay EP. Thus, a stick circuit for relay OCP1 is provided until all of the parallel branches in the stick circuit are open.

When relay OCP1 becomes energized relay OTP is energized by the previously described pick-up circuit which includes front contact 37 of relay OCP1. The subsequent opening of back contact 20 of relay OTP opens the pick-up circuits previously described for the transmitter control relays T1 and T2. The closing of back contacts 41 and 42 of relays T1 and T2, respectively, causes the energization of relay OP as previously described.

In the operating sequence relay ECP1 is then energized by a previously described pick-up circuit which includes front contact 27 of the cancel button CB, front contact 45 of relay OP, and front contact 46 of relay OCP1. A stick contact 92 of relay ECP1 closes to provide a second energizing means for relay ECP1. In other words, on any given step in a control cycle either back contact 28 or front contact 45 of relay OP is closed. These contacts are respectively in series with front contact 92 of relay ECP1 and front contact 46 of relay OCP1. Thus, the sustained energization of relay ECP1 is ultimately dependent upon the energized state of relay OCP1.

In view of the previously described operations of the stepping relays B1, B2 and B3 it can be said that at the end of step 7 in a control cycle relay B1 is energized while relay B3 is deenergized. Therefore back contact 90 of relay B1 and front contact 91 of relay B3 are open in the stick circuits for relay OCP1. Furthermore, at the end of step 7 relay EP is energized resulting in the opening of its back contact 35 and the closing of its front contact 35. Relay OCP1 is then deenergized; and relay OCP2 is energized by a pick-up circuit which includes contact 34 of the cancel button CB, front contact 35 of relay EP, front contact 93 of relay B1, back contact 94 of relay B3, front contact 95 of relay ECP1, and the upper winding of relay OCP2. A stick circuit including back contact 35 of relay EP, back contact 96 of relay OCP1, and front contact 97 of relay OCP2 is provided for holding relay OCP2 energized.

At the end of step 8 relay OP is energized closing its front contact 45 and opening its back contact 28 in the previously described energizing circuits for relay ECP1. The energizing circuit which includes front contact 45 of relay OP is already open at front contact 46 of relay OCP1. The opening of back contact 28 of relay OP opens the previously described stick circuit for relay ECP1. Therefore, relay ECP1 releases its armature when code transmission is terminated on step 8. Relay ECP2 is then energized by a pick-up circuit which includes front contact 27 of the cancel button CB, front contact 45 of relay OP, back contact 46 of relay OCP1, front contact 98 of relay OCP2, and the upper winding of relay ECP2. An alternate energizing circuit for relay ECP2 is provided and includes back contact 28 of relay OP, back contact 29 of relay ECP1, and front contact 99 of relay ECP2.

The closing of front contact 100 of relay ECP2 provides an alternate energizing circuit for relay SCT, the energizing circuit also including front contact 101 of relay SCT. Since relay ECP1 is already deenergized the pick-up circuit previously described for relay SCT which includes front contact 47 of relay ECP1, is open. The continued energization of relay SCT is therefore dependent upon the continued energization of relay ECP2.

It can be seen that relays OCP1 and ECP1 are held energized for the duration of the first cycle of operation by the stepping relays B1, B2 and B3. At the termination of the last odd-numbered step (step 7) in the first cycle of operation relay OCP1 is deenergized, while relay ECP1 is deenergized at the end of the last even-numbered step (step 8) in the first cycle of operation. Relay OCP2 and ECP2 are subsequently energized and remain energized for the duration of the second cycle of operation by the stepping relays.

At the end of step 15 stepping circuit conditions correspond to those previously described as existing at the end of step 7. In other words, relays B1 and EP are energized while relays B2, B3 and OP are deenergized. Back contact 90 of relay B1 and front contact 91 of relay B3 are open in one energizing circuit for relay OCP2, while back contact 35 of relay EP and back contact 94 of relay B3 are open in respective alternate energizing circuits for relay OCP2. As a result relay OCP2 is deenergized.

At the end of step 16, which corresponds to step 8 in the first operating cycle, relay OP is energized. Back contact 28 of relay OP opens one energizing circuit for relay ECP2. The alternate energizing circuit for relay ECP2 is opened by front contact 98 of relay OCP2, relay ECP2 becoming deenergized.

Thus, relays OCP2 and ECP2 are energized for the duration of the second cycle of operation by the stepping relays B1, B2 and B3; and it is evident that the provision of additional cycle counting relays and operating circuits would permit the stepping relays to perform additional cycles of operation.

It should be noted that the use of two cycle counting relays (OCP1 and ECP1, OCP2 and ECP2) in detecting each stepping cycle permits the use of each code step for the transmission of a code character. In other words, the operating time normally allotted to a particular step is never required for the conditioning of cycle counting relays. If the circuits were modified to replace relays OCP1 and ECP1 by a single relay, while replacing relays OCP2 and ECP2 by a single relay, a particular time interval would be required at the end of the first stepping cycle for the deenergization of the former relay and the energization of the latter. In order to provide sufficient time for relay operations, while ensuring the proper conditioning of the step-forming networks, at least one step would have to be eliminated insofar as code transmission is concerned to allow sufficient time for relay operations. In the present invention, the cycle counting relays are conditioned during times when they are not in use. Relay OCP1 is deenergized and relay OCP2 is energized after code transmission is completed on the last odd-numbered step (step 7) of the first stepping cycle. Since at this time the odd-numbered step-forming network is inactive, the conditioning of relays OCP1 and OCP2 is not a vital consideration. The respective front contacts of relays OCP1 and OCP2 have time to open and close, respectively, during code transmission on the last even-numbered step (step 8) of the first stepping cycle, thereby conditioning the odd-numbered step-forming network for the second stepping cycle. Similarly, relays ECP1 and ECP2 are respectively deenergized and energized after code transmission is completed on step 8; and the relays are given operating time during the first odd-numbered step (step 9) of the second stepping cycle. The even-numbered step-forming network is then conditioned before code transmission is to begin on step 10. Thus, the use of two cycle counting relays for detecting each cycle of stepping operations permits the use of each and every code step for code transmission, thereby increasing the speed and capacity of the system.

While relay SCT remains energized back contact 33 of relay SCT is open in the pick-up circuit for relay OCP1. Thus, it is impossible to energize relay OCP1 by means of the start button SB as long as an operating cycle is in progress. When relay ECP2 releases its armature at the end of step 16, front contact 100 of relay ECP2 opens to deenergize relay SCT. The subsequent closing of back contact 33 of relay SCT conditions the pick-up circuit for relay OCP1 to be operative as soon as relay OP becomes deenergized, closing its back contact 28. The opening of front contact 60 of relay SCT prevents further operations by relays B1, B2 and B3.

As soon as relays OP and OTP become deenergized at the end of a code transmission cycle in a manner to be described in greater detail, the control transmission apparatuses reassume their normal, or at rest, conditions. Another operating cycle can then be initiated.

In Fig. 1B front contacts 53, 76, 79 and 80 of relay OCP1 render steps 1, 3, 5 and 7, respectively, responsive to operations of the stepping relays B1, B2 and B3 during the first cycle of stepping relay operation. Similarly, front contacts 102, 103, 104 and 105 of relay OCP2 render steps 9, 11, 13 and 15, respectively, effective during the second cycle of stepping relay operation. Front contacts 70, 82, 83 and 84 of relay ECP1 render steps 2, 4, 6 and 8, respectively, effective during the first cycle of operation by the stepping relays, while front contacts 106, 107, 108 and 109 of relay ECP2 render steps 10, 12, 14 and 16, respectively, effective during the second cycle of stepping relay operation. It is evident, as previously stated, that the provision of additional cycle counting relays would permit the extension of the even numbered and odd numbered control networks to include greater step capacities, and step capacities increasing in multiples of eight.

Inspection of the arrangement of stepping relay contacts in the step-forming networks of Fig. 1B and further inspection of the stepping relay sequence chart of Fig. 3 reveals that each step channel excludes contacts of the particular stepping relay which is operated immediately before such step channels become effective. For example, before step 2 channel is made effective relay B3 is energized; but step 2 channel does not include a front contact of relay B3. Similarly, relay B1 is deenergized immediately prior to the time when step 5 channel is made effective; but step 5 channel does not include a back contact of relay B1. The exclusion of particular stepping relay contacts in particular step channels insures uniformity of code pulse transmissions, since irregularities in the operating characteristics of the stepping relays cannot affect pulse spacings.

The various control code steps are made effective in a sequence determined by the operations of the stepping relays B1, B2 and B3 and the cycle counting relays OCP1, ECP1, OCP2 and ECP2 as previously described. Energy is selectively applied to the step forming networks by contacts of the pulse timing relays OTP and ETP and the pulse spacing relays OP and EP. Odd numbered steps are made effective in energizing relays T1 or T2 when front contact 49 of relay OTP and back contact 50 of relay EP are closed. Similarly, when front contact 66 of relay ETP and back contact 67 of relay OP are closed, even numbered steps are made effective in energizing relays T1 or T2. Assuming the previously described operations of the stepping relays takes place during each code cycle, a more specific description of the operations of the pulse timing relays OTP and ETP and the pulse spacing relays OP and EP can be given.

As previously described the transmitter control relays T1 and T2 are normally energized when the code communication system is at rest. An actuation of the start button SB causes the energization of relay OCP1 and the resultant energization of relay OTP by the pick-up circuit which includes front contact 37 of relay OCP1, front contact 38 of relay T2 and back contact 40 of relay OP. The subsequent opening of back contact 20 of relay OTP deenergizes the relays T1 and T2. Front contacts 38 and 39 of relays T2 and T1 respectively open in the pick-up circuit for relay OTP. However, relay OTP is slow-acting and retains its armature until back contacts 38 and 39 of relays T2 and T1, respectively, close the second pick-up circuit which includes back contact 57 of relay ETP. Concurrent closings of back contacts 41 and 42 of relays T1 and T2, respectively, cause relay OP to be energized by the pick-up circuit which includes back contact 43 of relay ETP and front contact 44 of relay OTP. Relays ECP1 and SCT are then energized as previously described, resulting in the subsequent energization of either relay T1 or T2.

Assuming again that relay T1 alone is actuated for code transmission, the energization of relay T1 indicates the beginning of code transmission on step 1. Back contact 41 of relay T1 opens one energizing circuit for relay OP; and the subsequent closing of front contact 41 of relay T1 closes the second energizing circuit for relay OP. The slow-release characteristics of relay OP cause the relay to retain its armature during the cross-over time of the movable contact 41 of relay T1. At the same time relay OTP is deenergized because of the opening of back contact 39 of relay T1 in one pick-up circuit. The alternate pick-up circuit for relay OTP is open at back contact 40 of relay OP. Relay ETP becomes energized by the pick-up circuit which includes front contact 39 of relay T1 and front contact 40 of relay OP.

When relay OTP, which is slow-acting, releases its armature front contact 49 opens in he odd-numbered step-forming network. The closing of front contact 66 of relay ETP energizes the even-numbered step-forming network, back contact 67 of relay OP having previously closed. Relay T1 is deenergized when the front contact 49 of relay OTP opens; and the deenergization of relay T1 results in the cessation of code transmission on step 1.

Front contact 39 of relay T1 then opens one energizing circuit for relay ETP; and the subsequent closing of back contact 39 of relay T1 closes the alternate energizing circuit for relay ETP. Relay ETP, being slow-acting, retains its armature during the time interval when the movable contact 39 of relay T1 crosses over. At the same time the opening of front contact 41 of relay T1 opens one energizing circuit for relay OP. The closing of back contact 41 of relay T1 cannot maintain energization of relay OP because the alternate energizing circuit for relay OP is open at back contact 43 of relay ETP. The closing of back contact 41 of relay T1 causes the energization of relay EP by the pick-up circuit which includes front contact 43 of relay ETP. Relay T1 is then energized on step 2 by the even-numbered step-forming network which is made effective by the closing of back contact 67 of relay OP, front contact 66 of relay ETP having been previously closed.

When relay T1 picks up to cause code transmission on step 2 back contact 39 of relay T1 opens one energizing circuit for relay ETP. The subsequent closing of front contact 39 of relay T1 is ineffective in the alternate pick-up circuit for relay ETP because front contact 40 of relay OP is open; relay ETP becomes deenergized. At the same time relay OTP is energized by the pick-up circuit which includes front contact 39 of relay T1 and back contact 40 of relay OP. The crossing over of contact 41 of relay T1 from its back contact to its front contact opens one pick-up circuit for relay EP and closes the alternate pick-up circuit; the slow-release characteristic of relay EP causes the relay to retain its armature during the contact cross-over time. Relay T1 becomes deenergized when relay ETP releases its armature resulting in the opening of its front contact 66. Code transmission on step 2 terminates when relay T1 releases its armature.

When relay T1 becomes deenergized, front contact 39 of relay T1 opens one pick-up circuit for relay OTP; back contact 39 of relay T1 closes, subsequently, the alternate pick-up circuit for relay OTP. Relay OTP, being slow-acting, bridges the crossing over of the movable contact 39 of relay T1. At the same time, front contact 41 of relay T1 opens one energizing circuit for relay EP. The subsequent closing of back contact 41 of relay T1 is ineffective in the alternate pick-up circuit for relay EP because this circuit is already open at front contact 43 of relay ETP. Since back contact 43 of relay ETP is closed, the closing of back contact 41 of relay T1 causes relay OP to be energized. When relay EP releases its armature, back contact 50 of relay EP closes to cause the energization of relay T1; and the energization of relay T1 causes the transmission of code energy on step 3.

When relay T1 is energized at the beginning of step 3, back contact 41 of relay T1 opens in one of the energizing circuits for relay OP. Since relay OP is slow-acting, it retains its armature until front contact 41 of relay T1 closes the alternate energizing circuit for relay OP. At the same time, relay OTP is deenergized by the opening of back contact 39 of relay T1; and the subsequent closing of front contact 39 of relay T1 is ineffective in the alternate energizing circuit for relay OTP since back contact 40 of relay OP is already open. Relay ETP is energized when front contact 39 of relay T1 closes, since front contact 40 of relay OP is closed. The opening of front contact 49 of relay OTP results in the deenergization of relay T1 and the subsequent cessation of code transmission on step 3. Similar relay operations occur alternately on succeeding odd and even-numbered steps until cyclical operation ceases.

In view of the preceding description, it is evident that the pulse timing relays ETP and OTP, the pulse spacing relays EP and OP and the transmitter control relays T1 and T2 cooperate in a dependent manner, the operation of each relay group being dependent upon the resultant operations of the other. Before code transmission occurs on each odd-numbered step, relay OTP is energized while relay OP is deenergized. When a transmitter control relay is energized on an odd-numbered step, relay OTP is deenergized while relay OP is energized; and relay EP is deenergized at the time when relay OP is energized. The duration of code transmission on an odd-numbered step is therefore dependent upon the release time of relay OTP. In other words, front contact 49 of relay OTP must be closed to render the odd-numbered step-forming network effective.

When relay OTP releases its armature code transmission on odd-numbered steps is terminated. As a result, relay OP is deenergized while relay EP is energized. Since back contact 67 of relay OP must close before code transmission can be effected on a succeeding even-numbered step, the release time of relay OP is a measure of the time spacing between an odd-numbered step and the succeeding even-numbered step.

Similarly, relay ETP is deenergized at the beginning of code transmission on any even-numbered step; and the release time of relay ETP determines the time interval during which the even-numbered step-forming network is effective. Relay EP, which is deenergized at the end of code transmission intervals on even-numbered steps, determines the time spacing between even-numbered steps and succeeding odd-numbered steps. In other words, back contact 50 of relay EP must close in the odd-numbered step-forming network.

It can be seen that once actuated the control code transmitting apparatus automatically performs cyclical stepping operations. When desirable, the test switch TS and the hand-step switch HSS may be used to operate the transmitting apparatus in an interrupted step-by-step manner. More specifically, when the test switch TS is moved to its position calling for hand-stepping operations, back contacts 55 and 77 open pick-up circuits for the transmitter control relays T1 and T2, respectively. Back contacts 71 and 72 of the test switch also open alternate pick-up circuits for relays T1 and T2, respectively. Further energizations of relays T1 and T2 are dependent upon operations of the hand-step switch HSS. When the switch HSS is moved to the "odd" position, front contacts 110 and 111 close in the pick-up circuits for relays T1 and T2 respectively. When switch HSS is moved to its "even" position, back contacts 112 and 113 close pick-up circuits for relays T1 and T2 respectively. Thus, operations of switch HSS to its "odd" and "even" positions successively permit relays T1 and T2 to be selectively energized by the odd-numbered and even-numbered step-forming networks. Since operations of the various stepping relays and timing relays are dependent upon operations of the transmitter control relays T1 and T2, as previously described, code transmissions under hand-stepping operations must be performed in successive odd and even selections by switch HSS. In this manner, the speed of operation of the code transmitting apparatus is dependent upon the speed of operation of the hand-step switch HSS.

In the control code receiving circuits in the field station (see Figs. 1C and 1D), the receivers NR1 and NR2 are capable of passing code energies having frequencies identical to the frequencies transmitted by the control office transmitters NT1 and NT2 respectively. Line relays L1 and L2 are actuated by code energies received by the receivers NR1 and NR2 respectively. The pick-up circuits for relays L1 and L2, respectively, include back contacts 120 and 121 of the transfer relay TN.

When the system is at rest, code energies are steadily applied to the line circuit resulting in the energization of relays L1 and L2. At the beginning of a control code cycle, energy is removed from the line circuit causing both relays L1 and L2 to become deenergized. For the duration of a code cycle, only one of the relays L1 and L2 will be energized at any time. For simplification, it is assumed that relay L1 only is actuated during a control cycle.

A bank of stepping relays B1, B2 and B3 is provided to perform a stepping operation similar to that described for identical relays in the control office; and the circuit network which includes the stepping relays performs in a manner identical to that described for the control office. In the field station, however, the stepping relays are actuated in response to operations of two step pulse relays ES and OS which will be described later in greater detail.

In order to count cycles of operation by the relays B1, B2 and B3, cycle counting relays OCP1, ECP1, OCP2 and ECP2 are provided. These relays and their control circuits are identical to those described for the control office, with the exception that relay OCP1 is energized when the system is at rest. Initially, relay OCP1 is energized by a pick-up circuit which includes back contacts 122 and 123 of relays SCR and TE, respectively. Relay OCP1 and relay ECP1, which becomes energized at the start of a control cycle, are energized during the first operating cycle of the stepping relays; and relays OCP2 and ECP2 are energized during the second cycle of operation by the stepping relays.

When the line relays L1 and L2 are deenergized at the start of a control code cycle, back contacts 124 and 125 of relays L1 and L2, respectively, close to energize the start cycle relay SCR. Since relays L1 and L2 may be alternately energized and deenergized during a control code cycle, the pick-up circuit for relay SCR may be briefly open. In order to preclude the dropping away of relay SCR, the lower winding of the relay is short-circuited during operating cycles by contacts 126, 127 and 128 of relays ECP1, OCP2 and ECP2, respectively. Whenever one of these contacts is closed, relay SCR is made slow-acting to the extent that it does not release its armature during momentary openings of its pick-up circuit.

In order to describe specifically the operations of the step pulse relays ES and OS, along with the step pulse repeater relay OES, when back contacts 130 and 131 of the line relays L1 and L2, respectively, close at the start of a control cycle, relay OS is energized by a pick-up circuit which includes those contacts along with back contact 132 of relay OES. When code energy is transmitted on step 1, relay L1 becomes energized, opening its back contact 130 in the pick-up circuit for relay OS. Front contact 130 of relay L1 then closes a stick circuit for relay OS which includes front contact 133 of relay SCR and front contact 134 of relay OS. Since relay OS is slow-acting, it does not release its armature during the crossing over of contact 130 of relay L1 from its back to its front contact position.

Relay OES is energized by a pick-up circuit which includes front contact 135 of relay L1, front contact 137 of relay SCR and back contact 138 of relay ES. The opening of back contact 132 of relay OES renders the previously described pick-up circuit for relay OS ineffective, resulting in the deenergization of relay OS when relay L1 is again deenergized at the termination of code transmission on step 1. In other words, front contact 130 of relay L1 opens the stick circuit for relay OS; and back contact 130 of relay L1 is incapable of maintaining energization of relay OS. Relay ES, however, can be energized at this time by a pick-up circuit which includes back contacts 130 and 131 of relays L1 and L2, respectively, and front contact 140 of relay OES.

During the time when relay L1 releases its armature, resulting in the deenergization of relay OS and the energization of relay ES, front contact 135 of relay L1 opens the previously described pick-up circuit for relay OES. Back contact 135 of relay L1 then closes a stick circuit for relay OES, the stick circuit also including back contact 136 of relay L2 and front contact 139 of relay OES. Since relay OES is slow-acting, it retains its armature during the cross over time of contact 135 of relay L1.

At the start of code transmission on step 2, relay L1 is again energized. Back contact 130 of relay L1 opens the pick-up circuit for relay ES; but since relay ES is slow-acting, it retains its armature until a stick circuit which includes front contact 135 of relay L1, front contact 137 of relay SCR and front contact 141 of relay ES, is closed. The opening of back contact 135 of relay L1 results in the deenergization of relay OES. In other words, the stick circuit for relay OES is opened; and the pick-up circuit for relay OES is already open at back contact 138 of relay ES.

When code energy is removed from the line circuit at the end of step 2, relay L1 is deenergized. Relay ES is subsequently deenergized by the opening of front contact 135 of relay L1 in the stick circuit for relay ES. The subsequent closing of back contact 130 of relay L1 in the pick-up circuit for relay ES is ineffective since the pick-up circuit is already open at front contact 140 of relay OES. Relay OS, however, becomes energized when back contact 130 of relay L1 closes in the previously described pick-up circuit for relay OS.

At the start of code transmission on step 3, relay L1 is energized. Back contact 130 of relay L1 opens the pick-up circuit for relay OS; and front contact 130 of relay L1 closes the stick circuit for relay OS. As previously described, relay OS retains its armature during the cross over of contact 130 of relay L1. Relay OES becomes energized at this time by the closing of front contact 135 of relay L1 in the previously described pick-up circuit for relay OES.

When code transmission ceases at the end of step 3, relay L1 is again deenergized. Front contact 135 of relay L1 opens the pick-up circuit for relay OES; and back contact 135 subsequently closes the stick circuit for relay OES; relay OES retains its armature during the cross over of contact 135 of relay L1. At the same time, relay OS is deenergized by the opening of front contact 130 of relay L1; and relay ES is energized by the closing of back contact 130 of relay L1.

Operations of the type previously described for relays ES, OS and OES during the first three steps of a control cycle continue for the duration of a complete cycle of operation. In other words, relay OS is energized when the line relays L1 and L2 are deenergized prior to code transmission on any odd-numbered step. Relay OS remains energized until the line relays are deenergized at the termination of code transmission on any odd-numbered step. Similarly, relay ES is energized when the line relays are deenergized at the end of code transmission on odd-numbered steps; and relay ES becomes deenergized when the line relays are deenergized at the end of code transmission on even-numbered steps. Relay OES is energized when the line relays are energized at the start of code transmission on odd-numbered steps, and deenergized when code transmission causes the energization of a line relay on even-numbered steps. The relays OS, ES and OES cooperate to provide a means for alternately energizing relays OS and ES on successive odd-numbered and even-numbered steps, respectively.

Relays OS and ES operate, therefore, in response to the reception of control codes at the field station. It can be seen that contacts of relays OS and ES which correspond to contacts of relays OP and EP, respectively, in the control office operate to cause cyclical stepping operations by the stepping relays B1, B2 and B3. The sequence of operation of the stepping relays is identical to that described for the stepping relays in the control office, this sequence being shown graphically in Fig. 3.

Before describing the field station step-forming networks in Fig. 1D, a description of the operation of the line repeater relays OLP1, OLP2, ELP1 and ELP2 must be given. When the system is at rest, the line repeater relays are all deenergized, while the line relays L1 and L2 are energized. After the initiation of a control code cycle in the control office the line relays L1 and L2 are deenergized, resulting in the energization of the start cycle relay SCR. Further operations of the line relays L1 and L2 in response to control codes cause the step pulse relays OS and ES to operate alternately and in cooperation with relay OES as previously described.

When code energy is received on step 1 either relay L1 or L2 is energized. If relay L1 is energized, relay OLP1 is energized by a pick-up circuit extending from (+), including front contact 142 of relay OS, front contact 143 of relay SCR, the lower winding of relay OLP1, and front contact 144 of relay L1, to (−). If relay L2, instead of relay L1, is energized on step 1, relay OLP2 is energized by a pick-up circuit extending from (+), including front contacts 142 and 143 of relays OS and SCR, respectively, the upper winding of relay OLP2, and front contact 145 of relay L2, to (−). At the time when either relay OLP1 or OLP2 becomes energized, relay OES becomes energized, closing stick circuits for relays OLP1 and OLP2. The stick circuit for relay OLP1 includes front contact 146 of relay OES, front contact 147 of relay SCR, front contact 148 of relay OLP1 and the upper winding of relay OLP1. Similarly, the stick circuit for relay OLP2 includes front contacts 146 and 147 of relays OES and SCR, respectively, front contact 149 of relay OLP2, and the lower winding of relay OLP2.

When code transmission ceases on step 1 relays L1 and L2 are deenergized; relay OES remains energized; and relay OS is deenergized while relay ES is energized. Front contacts 144 and 145 of relays L1 and L2, respectively, are open in the pick-up circuits for relays OLP1 and OLP2, respectively. Front contact 142 of relay OS opens in the common portion of the pick-up circuits for relays OLP1 and OLP2; and back contact 142 of relay OS subsequently closes. Back contact 142 of relay OS is connected in parallel with the series combination of contacts 146 and 147 of relays OES and SCR, respectively. At this time both parallel branches are closed, each energizing the stick circuit for whichever relay OLP1 or OLP2 has been energized on step 1.

When code energy is transmitted on step 2 either relay L1 or L2 is energized. Relay ES remains energized, relay OS remains deenergized and relay OES becomes deenergized as previously described. The stick circuits for relays OLP1 and OLP2 are maintained by back contact 142 of relay OS, while front contact 146 of relay OES opens the parallel branch. Thus, relay OLP1 or OLP2 remains energized during step 2. At the same time, either relay ELP1 or ELP2 is energized depending on which line relay L1 or L2 becomes energized on step 2. If relay L1 is energized, relay ELP1 becomes energized by a pick-up circuit extending from (+), including back contact 150 of relay OS, front contact 151 of relay SCR, the lower winding of relay ELP1, and front contact 152 of relay L1, to (−). Similarly, if relay L2 is energized on step 2, relay ELP2 is then energized by a pick-up circuit extending from (+), including back contact 150 of relay OS, front contact 151 of relay SCR, the upper winding of relay ELP2, and front contact 153 of relay L2, to (−). Back contact 154 of relay OES and front contact 155 of relay SCR form the common portion of stick circuits for relays ELP1 and ELP2; the stick circuit for relay ELP1 also includes its front contact 156 and its upper winding, while the stick circuit for relay ELP2 also includes its front contact 157 and its lower winding.

Upon the cessation of code transmission on step 2 relays L1 and L2 are deenergized, resulting in the energization of relay OS and the deenergization of relay ES. Back contact 142 of relay OS opens the stick circuits for relays OLP1 and OLP2, resulting in the deenergization of the particular one of those relays which had been energized on step 1. Front contact 158 of relay OS closes a common portion of a stick circuit for relays ELP1 and ELP2, contact 158 of relay OS being in parallel with the previously described series combination of back contact 154 of relay OES and front contact 155 of relay SCR. The pick-up circuits for relays ELP1 and ELP2 are opened at front contacts 152 and 153, respectively, of relays L1 and L2, respectively; and back contact 150 of relay OS is open in the common portion of the pick-up circuits for relays ELP1 and ELP2.

At the start of code transmission on step 3 relay L1 or relay L2 becomes energized resulting in the energization of relay OES and of either relay OLP1 or OLP2 in the manner previously described; and one of the previously described stick circuits which includes front contact 146 of relay OES closes to maintain either relay OLP1 or OLP2 energized. At the same time, one of the parallel branches in the common portion of the stick circuits for relays ELP1 and ELP2 is opened by back contact 154 of relay OES; the other branch which includes front contact 158 of relay OS remains closed.

When code transmission ends on step 3, relays L1 and L2 are deenergized, resulting in the deenergization of relay OS and the energization of relay ES. Front contact 158 of relay OS opens the remaining effective branch of the common portion of the stick circuits for relays ELP1 and ELP2; and whichever of those relays had been previously energized on step 2 becomes deenergized. However, relay OLP1 or relay OLP2, whichever became energized on step 3, remains energized by its stick circuit.

In view of the preceding description of operations of relays OLP1, OLP2, ELP1 and ELP2 over three code transmission steps, it is evident that further operations on succeeding steps will be the same. At the start of each odd-numbered step either relay L1 or L2 is energized resulting in the energization of either relay OLP1 or OLP2, respectively. Once energized, relay OLP1 or relay OLP2 remains energized until code transmission ceases at the end of the next even-numbered step. Similarly, either relay ELP1 or ELP2 becomes energized on each even-numbered step and becomes deenergized at the end of code transmission on the next odd-numbered step.

Contacts of relays OLP1, OLP2, ELP1 and ELP2 are used to polarize the step-forming networks of Fig. 1D. If relay OLP1 is energized during code transmission on an odd-numbered step, (B+) energy is applied to the odd-numbered step-forming network by front contact 160 of relay OLP1 and back contact 161 of relay OLP2. If relay OLP2, instead of relay OLP1, is energized on an odd-numbered step, (B−) energy is applied to the odd-numbered step-forming network by front contact 161 of relay OLP2 and back contact 162 of relay OLP1. Similarly, if relay ELP1 is energized during an even-numbered step, (B+) energy is applied to the even-numbered step-forming network by front contact 163 of relay ELP1 and back contact 164 of relay ELP2. If relay ELP2, instead of relay ELP1, becomes energized on an even-numbered step, (B−) energy is applied to the even-numbered step-forming network by front contact 164 of relay ELP2 and back contact 165 of relay ELP1.

The odd-numbered step-forming network also includes front contact 166 of relay ES which must close to render the network effective. Contact 167 of relay B1, contact 168 of relay B2, and contact 169 of relay B3 are operated to define the odd-numbered steps of each eight-step cycle. Front contacts of the cycle counting relays ECP1 and ECP2 are provided and are operated to differentiate between similar step channels formed in different cycles. In other words, the positions assumed by the contacts of relays B1, B2 and B3 in forming step channels 1 and 9, for example, are identical. However, relay ECP1 is energized for the first eight-step stepping cycle, while relay ECP2 is energized for the second cycle; steps 1 and 9 are thereby defined by contacts of relays ECP1 and ECP2, respectively.

The even-numbered step-forming network also includes front contact 170 of relay OS which must be closed to render the network effective. The various even-numbered steps are defined by operations of contact 171 of relay B2 and contacts 172 and 173 of relay B3; contacts of the cycle counting relays OCP1 and OCP2 differentiate between similar channels formed during different stepping cycles.

At the time when code energy is transmitted on the first transmission step, relays B1, B2, B3, ES, OLP1 and OLP2 are deenergized, relay OS being energized. Assuming that when code transmission begins on step 1 relay L1 is energized, relay OLP1 becomes energized and closes its stick circuit. When code transmission on step 1 terminates relay L1 becomes deenergized, causing the energization of relay ES and the deenergization of relay OS. The energization of relay OS causes relay B3 to become energized and also closes the energizing circuit for the odd-numbered step-forming network. Thus, step 1 channel extends from (B+) and includes front contact 160 of relay OLP1, back contact 161 of relay OLP2, front contact 166 of relay ES, back contact 167 of relay B1, back contact 168 of relay B2, front contact 174 of relay OCP1, and front contact 175 of relay ECP1. A similar circuit could be traced from (B−) if relay L2 (and therefore relay OLP2) had been energized instead of relay L1. Energy of a code selected polarity is applied on step 1 to a relay HS in the present circuits.

Shortly after relay ES is energized, code transmission on step 2 begins, resulting in the energization of either relay L1 or L2. Relay ELP1 or ELP2 is then energized and held by its stick circuit. When code transmission on step 2 terminates, relay L1 or L2 is deenergized so that both relays are again in states of deenergization. Relay OS is subsequently energized and relay ES is deenergized. Consequently, relay B1 is energized while the stick circuit for relays OLP1 and OLP2 is opened. Thus, the odd-numbered step-forming network is deenergized as a result of the opening of front contact 166 of relay ES; the later opening of front contact 160 of relay OLP1 also opens the energizing circuit for the odd-numbered step-forming network. Step 2 channel is made effective by the closing of front contact 170 of relay OS, front contact 173 of relay B3 being already closed. The polarity of energy applied to step 2 channel is determined by whichever relay ELP1 or ELP2 is energized.

The reception of a code on any odd-numbered transmission step results in the energization of either relay OLP1 or OLP2; and either relay remains energized until code transmission on the next even-numbered step ceases.

Thus, a selected code character is stored for a time which approximates the duration of two transmission steps. The odd-numbered step-forming network is polarized by relays OLP1 and OLP2 but is not effective until relay ES closes its front contact 166 and the stepping relays are actuated. Relay ES is not energized until code transmission ceases on any odd-numbered step; and the energization of relay ES effects the operation of the stepping relays. Thus, code transmission must be completed on any given odd-numbered step before the field station circuits are conditioned to utilize the code information to operate signaling devices. This delay in utilization precludes faulty operations which might result from irregularities in code pulse lengths, line circuit attenuation effects or any other inherent transmission problems which might affect pulse lengths or spacings. It should be noted that the arrangements of stepping relay contacts in the step-forming networks are such that each step channel excludes contacts of the particular stepping relay which is operated to form the next step channel. Step 1 channel, for example, includes back contacts 167 and 168 of relays B1 and B2, respectively, but does not include a back contact of relay B3. Since relay B3 is energized at the end of code transmission on step 1, the including of a bank contact of relay B3 in step 1 channel would result in the opening of the channel shortly after it had been made effective by the closing of front contact 166 of relay ES. Thus, the exclusion of contacts of relay B3 provides for a maximum time during which step channel 1 is effective. Inspection of the step-forming networks of Fig. 1D and the stepping relay sequence chart of Fig. 3 shows the pattern of contact elimination for all steps.

A relay WZ is shown connected to the output terminal of step 2 channel. Relay WZ is assumed to be used in controlling a track switch, control circuits (not shown) for such devices being well-known in the art. It is assumed that relay WZ is of the two-position magnetic-stick type which responds to polarized energy and which retains its armature in the last operated position. Relay WZ is then selectively operated on step 2 in accordance with the polarity of energy applied to the even-numbered step-forming network by contacts of the line repeater relays ELP1 and ELP2. As previously described, relays ELP1 and ELP2 respond to operations of the line relays L1 and L2, respectively. Line relays L1 and L2 are energized whenever their associated code receivers NR1 and NR2 are activated by code energies having frequencies peculiar to the transmitters NT1 and NT2, respectively, in the control office. Transmitters NT1 and NT2 are selectively energized on step 2 by the transmitter control relays T1 and T2, respectively. Relays T1 and T2 are selectively energized on step 2 in accordance with the position assumed by the control lever associated with step 2 channel in the control office.

*Indication code transmission*

The indication code communication system is assumed to be essentially identical to the control code communication system. The energy frequencies used in indication code transmission are assumed to differ from each other and from those employed in control code transmissions. Transmitters NT3 and NT4 (or ST3 and ST4) are assumed to be selectively controlled by circuits which are identical to those described for the control office portion of the control code communication system (Figs. 1A and 1B). However, the initiation of circuit operation is not produced through the use of a start button; nor are levers employed to select code characters. Instead, codes are assumed to be selected by relays (not shown) which respond to operations of signaling devices and thereby indicate the conditions of such devices. System operation is further assumed to be initiated by a relay or other device which is actuated whenever any change occurs in the condition of signaling devices. Such circuits need not be shown in describing the present invention, since circuits of this type are well-known in the art.

At the control office, the indication code receiving circuits are assumed to be identical to those described for the field station control code receiving circuits (Figs. 1C and 1D). It is assumed that any number of well-known electroresponsive indicating devices may be used; and such devices are operated from particular step channels.

Essential portions of the indication code transmitting circuits are shown in Fig. 1D. The normally used transmitter NT3 is energized by a pick-up circuit which includes back contact 180 of the transfer relay TN and front contact 181 of the transmitter control relay T3. Similarly, the normally used transmitter NT4 has a pick-up circuit which includes back contact 182 of relay TN and front contact 183 of relay T4.

In the control office (see Fig. 1B), the indication code actuated line relays L3 and L4 are shown. Relay L3 has a pick-up circuit including back contact 184 of relay TN and the code receiver NR3. Similarly, the pick-up circuit for relay L4 includes back contact 185 of relay TN and the code receiver NR4.

The start cycle relay SCR in the control office is shown having a pick-up circuit which includes back contacts 199 and 200 of relays L3 and L4, respectively, contacts 199 and 200 being connected in parallel.

*Apparatus transfer*

In the control office (see Figs. 1A and 1B) the normally-used control code transmitters NT1 and NT2 are operable by front contact 24 of relay T1 and front contact 26 of relay T2, respectively, whenever back contacts 23 and 25, respectively, of the transfer relay TN are closed. The standby control code transmitters ST1 and ST2 are operable by front contact 190 of relay T1 and front contact 191 of relay T2, respectively, whenever front contacts 23 and 25, respectively, of relay TN are closed. Thus, whenever relay TN is deenergized transmitters NT1 and NT2 are in service; and whenever relay TN is energized the standby transmitters ST1 and ST2 are placed in service. Similarly, the normally-used indication code receivers NR3 and NR4 are connected to line relays L3 and L4, respectively, when back contacts 184 and 185, respectively, of relay TN are closed. When relay TN is energized its front contacts 184 and 185 are closed to cause relays L3 and L4, respectively, to be connected to the respective standby receivers SR3 and SR4.

Relay TN is therefore assumed to be normally deenergized. In order to energize relay TN back contact 192 of the normal cycle detection relay NCD must close. Once energized, a stick circuit for relay TN is closed; the stick circuit includes front contact 193 of relay TN and front contact 194 of the standby cycle detection relay SCD.

When relay TN is deenergized and the normally-used code transmitters and receivers at the control office are in service, relay NCD is energized by a circuit which includes back contact 195 of relay SCR, back contact 196 of relay TN, relay winding NCD and contact 197 of the Transfer Switch. A capacitor unit 198 is connected in parallel with the relay winding NCD for reasons to be explained.

When the indication code communication system is at rest code energies are applied steadily to the line circuit at the field station, resulting in the energization of the line relays L3 and L4. At the start of an indication code cycle relays L3 and L4 are deenergized because of the removal of code energy from the line circuit. Back contacts 199 and 200 of relays L3 and L4, respectively, close parallel energizing circuits for relay SCR. Relays L3 and L4 respond to code pulses transmitted on various indication code steps, only one relay being energized at any time. Since relay SCR is slow acting, momentary open conditions in both of the parallel pick-up circuits do not cause the relay to release its armature; and relay SCR retains its armature until the end of the code transmission cycle. It is evident that the failure of either or both of the receivers NR3 and NR4 would result in the deenergization of either or both of the line relays L3 and L4, thereby energizing relay SCR. Relay NCD detects the difference between energizations of relay SCR caused by failures in apparatus and energizations resulting from the initiations of code transmission cycles. When back contact 195 of relay SCR opens the energizing circuit for relay NCD, the capacitor unit 198 discharges through relay winding NCD. It is assumed that the capacitance of the unit 198 is sufficient to cause relay NCD to retain its armature for a period of time at least equal to the time required for a code transmission cycle. Relay SCR becomes deenergized at the end of each indication code cycle, and back contact 195 of relay SCR recloses the energizing circuit for relay NCD. In the case of an apparatus failure, however, relay NCD releases its armature after a time, closing back contact 192 of relay NCD. The transfer relay TN is then energized, closing its stick contact 193. A transfer from normally-used to standby apparatus is thereby effected in the control office.

It should be noted that although the previously described failure occurred in the indication code communication apparatus, a transfer is made which places the standby control code transmitters ST1 and ST2 in service. During the time required for the transmitters ST1 and ST2 to warm up, control code energies are removed from the line circuit. The line relays L1 and L2 (see Figs. 1C and 1D) at the field station are deenergized. Relay SCR in the field station is energized by the closings of back contacts 124 and 125 of relays L1 and L2, respectively. Back contact 201 of relay SCR opens an energizing circuit for relay NCD; the energizing circuit also includes back contact 202 of relay TN. A capacitor unit 203 is connected in parallel with relay winding NCD for purposes described for identical control office apparatus. The capacitor unit discharges through relay winding NCD; and relay NCD holds its armature until the time normally required for code cycle transmission elapses. Relay NCD releases its armature, closing back contact 204. The transfer relay TN is then energized causing the standby control code receivers SR1 and SR2 and the standby indication code transmitters ST3 and ST4 to be placed in service.

As soon as transmitters ST1 and ST2 in the control office and transmitters ST3 and ST4 in the field station warm up, code energies are applied steadily to the line circuit. The return of control code energy results in the energization of the line relays L1 and L2 in the field station. Back contacts 124 and 125 of relays L1 and L2, respectively, open to deenergize relay SCR. Relay NCD is then energized by a pick-up circuit including back contact 205 of relay SCR and front contact 202 of relay TN. During the previously described operations, relay TN is held energized by a stick circuit which includes front contact 206 of relay TN and front contact 207 of the standby cycle detection relay SCD.

At the control office (Figs. 1A and 1B), the return of indication code energies causes relays L3 and L4 to be energized, opening their respective back contacts 199 and 200. Relay SCR is then deenergized, closing its back contact 208 in an energizing circuit for relay NCD; relay NCD becomes energized, since front contact 196 of relay TN is already closed. A second energizing circuit for relay NCD including front contact 218 of relay NCD and back contact 219 of relay HS is closed. During the preceding operations relay TN is maintained in a state of energization by its stick circuit.

Since the code communication systems and the transfer circuits at both the field station and the control office are essentially identical, a similar apparatus transfer operation could be described for instances in which control code apparatus failed.

Before describing transfer operations when a failure in standby apparatus occurs, circuit operations relevant to the standby cycle detection relay SCD in the control office during the previously described transfer operations should be disclosed. Relay SCD is normally energized by a circuit which includes back contact 209 of relay SCR in parallel with the series combination of front contact 210 of relay SCD and back contact 211 of relay HS, back contact 212 of relay TN, relay winding SCD and contact 213 of the transfer switch. A capacitor unit 214 is connected in parallel with relay winding SCD. When relay L3 and/or L4 is deenergized resulting in the energization of relay SCR, back contact 209 of relay SCR opens one of the energizing circuits for relay SCD; but the parallel circuit including front contact 210 of relay SCD and back contact 211 of relay HS maintains energization of relay SCD. When relay NCD releases its armature, as previously described relay TN is energized. Back contact 212 of relay TN opens the energizing circuit for relay SCD; but a new energizing circuit which includes front contact 215 of relay TN and back contact 216 of relay NCD is closed. Thus, relay SCD remains energized when a transfer from normally-used to standby apparatus occurs. When code energy is restored to the line circuits, relays L3 and L4 are energized, causing the deenergization of relay SCR as previously described. Another energizing circuit for relay SCD is closed, the circuit including back contact 217 of relay SCR and front contact 212 of relay TN. The energization of relay NCD which occurs as described when back contact 208 of relay SCR closes, results in the opening of back contact 216 of relay NCD in the previously effective energizing circuit for relay SCD. Identical circuits and circuit operations could be described for the relay SCD at the field station (Figs. 1C and 1D).

Assume now that a failure occurs in the indication code communication apparatus while standby apparatus is in use. At the control office (Figs. 1A and 1B) either or both of the line relays L3 and L4 become deenergized as described, resulting in the energization of relay SCR. Back contact 217 of relay SCR opens the energizing circuit for relay SCD. Relay SCD releases its armature when capacitor unit 214 discharges sufficiently. Front contact 194 of relay SCD opens to deenergize relay TN. Contacts 23, 25, 184 and 195 of relay TN cross over from their front to their back positions, thereby removing standby apparatus from service and placing normally used apparatus in service. Since transmitters NT1 and NT2 require warming up time, code energy is removed from the control code receiving apparatus in the field station. Transfer operations result at the field station in an identical manner.

During the transfer operations, front contact 196 of relay TN opens the effective energizing circuit for relay NCD. Another energizing circuit is established, however, and includes back contact 220 and 221 of relays TN and SCD, respectively. Relay NCD, therefore, remains energized throughout transfers from standby to normally-used apparatus.

Upon the restoration of code energies to the line circuit, relays L3 and L4 become energized resulting in the deenergization of relay SCR. Back contact 209 of relay SCR closes to energize relay SCD. Thus, the transfer circuits return to their initial conditions. The transfer circuits at the field station (Figs. 1C and 1D), being identical to those described for the control office, also return to their initial conditions when line relays L1 and L2 become energized resulting in the deenergization of relay SCR and the subsequent energization of relay SCD.

At the control office (Figs. 1A and 1B), the timing relay TE can be energized by the closing either of back contact 222 of relay NCD or of back contact 223 of relay SCD. A pick-up circuit for relay NCD is provided which includes back contact 224 of relay HS, front contact 225 of relay TE and front contact 196 of relay TN. A similar pick-up circuit for relay SCD includes back contact 226 of relay HS, front contact 227 of relay TE and back contact 212 of relay TN. Relay TE is energized whenever either relay NCD or SCD becomes deenergized; and the completion of a timing operation by relay TE results in the energization of either relay NCD or SCD. More specifically, assume that an apparatus failure occurs while normally-used indication code communication apparatus is in use. Relay NCD becomes deenergized and relay TN is energized as previously described. If the standby apparatus is in a state of failure, code energy does not return to the line circuit. Therefore relay NCD remains deenergized, since back contact 208 of relay SCR cannot close. Back contact 192 of relay NCD maintains closure of the pick-up circuit for relay TN; and back contact 216 of relay NCD maintains closure of an energizing circuit for relay SCD. Such conditions exist until relay TE completes a timing operation, closing its front contact 225. Relay NCD becomes energized, opening its back contact 222 to deenergize relay TE. Back contact 216 of relay NCD opens the effective energizing circuit for relay SCD. Relay TE opens its front contacts; but relay NCD is held energized by the circuit including front contact 218 of relay NCD, back contact 219 of relay HS and front contact 196 of relay TN. When relay SCD releases its armature, relay TN is deenergized causing a transfer to normally-used apparatus. The timing relay TE starts another timing operation because of the closing of back contact 223 of relay SCD. If code energy is not restored to cause relay SCD to become energized by the closing of back contact 209 of relay SCR, relay TE completes its timing operation. Front contact 227 of relay TE closes to energize relay SCD which, in turn, opens its back contact 221 and 223 in the respective energizing circuits for relay NCD and TE.

In view of the preceding description it can be seen that the timing relay TE is operated whenever a failure is indicated by the releasing of either relay NCD or SCD. If relay NCD or SCD is not restored within a predetermined time interval, relay TE causes the restoration of the deenergized relay. Therefore, hunting operations occur which alternately place the normally-used and the standby apparatus in service. Relay TE may be of either the thermal or the motor driven type. Timing operations performed by relay TE are assumed to be long enough to permit the warming-up and operation of the various code transmitters and/or receivers. Therefore, relay TE is cut-off when code energy returns, but continues to perform timing operations as long as the predetermined times allowed for the restorations of service are exceeded. Relay TE provides a means for automatically hunting for usable apparatus, thereby precluding the rendering of the system inoperative when transient abnormal conditions occur in the code transmission apparatus. It can be noted that each time that relay TE becomes energized, back contact 31 of relay TE opens the previously described circuit which includes the start button SB, thereby preventing the starting of a control code transmission cycle while abnormal conditions exist.

A similar timing relay TE is provided to perform identical operations in the field station transfer circuits (Figs. 1C and 1D).

Transfer operations are initiated manually by using the transfer switch provided in the control office (Figs. 1A and 1B). The transfer switch is assumed to be of the three-position type, spring biased to assume its center position. When the switch is moved to its normal position front contact 213 opens and back contact 213 subsequently closed, back contact 197 remaining closed throughout. Similarly, when the switch is moved to its standby position back contact 197 opens and front contact 197 closes, front contact 213 remaining closed throughout. When the transfer switch is moved to its standby position and then released: back contact 197 opens to deenergize relay NCD and, consequently, opens the discharge circuit for the capacitor unit 198; the capacitor unit 198 is discharged when front contact 197 closes; and back contact 197 recloses to permit the energization of relay NCD upon the completion of transfer operations. Contact 213 of the transfer switch performs similar functions with regard to relay SCD and capacitor unit 214 when the transfer switch is moved to its normal position and then released. It can be noted that the only difference between the transfer circuits at the control office and those at the field station is the provision of the transfer switch at the control office. Transfer switches can be provided or eliminated, depending upon the needs of practice.

If it is desired to perform hand-stepping operations for any reason, it is evident that the time required for stepping operations may usually exceed the release times of the cycle detection relays NCD and SCD. It is desirable to preclude transfer operations while hand-stepping operations are in progress.

Referring to Figs. 1A and 1B, assume that the control office test switch TS is moved to its hand position. Back contacts 55 and 77 of the test switch TS open to deenergize relays T1 and T2 respectively. The control code communication system at both the control office and the field station operate as previously described to become responsive to operations of the hand-step switch HSS. Front contacts 48, 49 and 53 of relays SCT, OTP and OCP1 close in step 1 channel. The hand-step relay HS is then energized by a circuit including step 1 channel, front contact 228 of test switch TS, the upper winding of relay HS and front contacts 229 and 230 of relays NCD and SCD, respectively. Relay HS, being of the magnetic-stick type, retains its armature in the last operated position; and the energizing polarity applied to relay HS on step 1 is assumed to be proper for causing relay HS to pick up its armature.

When relay HS is energized, its back contacts 219 and 224 open two of the previously described energizing circuits for relay NCD. Back contacts 211 and 226 of relay HS open two of the previously described energizing circuits for relay SCD. Front contact 231 of relay HS and contact 232 of test switch TS are each connected in parallel with back contact 195 of relay SCR in one energizing circuit for relay NCD. Similarly, front contact 233 of relay HS and contact 234 of test switch TS are each connected in parallel with back contact 217 of relay SCR in an energizing circuit for relay SCD. In this manner, transfer operations which would normally result from a failure in the indication code communication system cannot be performed to interrupt the hand-stepping operation in progress in the control code communication system. When normally-used apparatus is in use, for example, relay TN is deenergized. An apparatus failure in the indication code system results in the ultimate energization of relay SCR. The opening of back contacts 195 and 209 of relay SCR in the effective energizing circuits for relays NCD and SCD, respectively, results in the deenergization of relay SCD only; relay NCD is held by circuits which include front contact 231 of relay HS and contact 232 of test switch TS. Since relay NCD cannot be deenergized, the transfer relay TN cannot be energized; and the deenergization of relay SCD has no effect. If, however, standby apparatus is in use, relay TN is energized. A failure under these conditions results in the deenergization of relay NCD, while relay SCD is held by contact 234 of test switch TS and contact 233 of relay HS. The transfer relay cannot be deenergized; and since it is already energized the deenergization of relay NCD produces no effect.

Under either of the conditions described above, however, the deenergization of either relay NCD or SCD caused by a failure in the indication code system, results in the energization of relay TE. When relay TE completes a timing operation its front contact 235 completes a circuit which includes front contact 236 and the lower winding of relay HS. The polarity of energy applied by this circuit is correct for causing relay HS to release its armature, thereby removing energy supplied to relays NCD or SCD by contacts 231 or 233, respectively, of relay HS. Continued energization of either relay NCD or SCD is then dependent upon contacts 233 or 234, respectively, of test switch TS. A returning of test switch TS to its automatic position then causes relays NCD and SCD to be deenergized, permitting operations of the transfer relay TN, relays NCD and SCD being both energized when service resumes.

If either relay NCD or SCD is deenergized, front contact 229 of relay NCD or front contact 230 of relay SCD opens the pick-up circuit for relay HS. Thus, hand-stepping operations cannot be performed while transfer conditions exist. If transfer operations are in progress before a hand-stepping operation is initiated, back contact 31 of relay TE is open in the cycle initiating circuit which includes contact 32 of start button SB. Relay HS cannot be caused to pick up its armature since either contact 229 of relay NCD or contact 230 of relay SCD is open; therefore front contact 237 of relay HS cannot close to by-pass back contact 31 of relay TE. If transfer operations are called for during a hand-stepping operation they cannot take place as previously explained. However, relay HS is caused to release its armature when relay TE completes a timing operation, thereby preventing the transmission of further control code cycles. In other words, back contact 31 of relay TE and front contact 237 of relay HS are open in the code cycle initiation circuit which includes contact 32 of the start button SB.

It can be noted that relay HS retains its armature in the picked-up position even after hand-stepping operations terminate. This condition does not prevent automatic code transmissions or transfer operations. However, an apparatus failure under such conditions requires a timing operation to be performed by relay TE, causing relay HS to release its armature to permit transfer operations to occur.

At the field station (Figs. 1C and 1D) the hand-step relay HS is operated from step 1 channel in the control network. Relay HS can be caused to pick up or to release its armature depending on the polarity of energy applied to the step 1 channel by contacts 160 and 162 of relay OLP1 and contact 161 of relay OLP2. A circuit which includes a contact of the timing relay TE is provided, as at the control office, to cause relay HS to release its armature whenever a failure occurs in control code transmission apparatus.

In the field station circuits no provisions are made for hand-stepping operations in which indication code cycles are transmitted manually. Although such provisions can be made, a simplified description is obtained by confining hand-stepping operations to the control code system.

In Figs. 1B indication lamps N and S are provided in the control office to indicate, respectively, that normally-used or standby apparatus is in use. When normally-used apparatus is in use, lamp N is energized by a circuit including front contact 238 of relay SCD and back contact 239 of relay TN. If an apparatus failure occurs, relay TN is energized, opening its back contact 239 to extinguish lamp N. Lamp S is then energized by a circuit including front contacts 240 and 241 of relay NCD and TN, respectively. Obviously, further transfers result in the alternate openings and closings of the energizing circuits for lamps N and S. When a failure occurs during hand-stepping operations, relay HS is energized and prevents the deenergization of relay NCD or SCD if normally-used apparatus or standby apparatus, respectively, is in use. The relay NCD or SCD not associated with the apparatus in use does become deenergized, however, as previously described. Therefore, when relay SCD releases its armature in response to an apparatus failure during hand-stepping operations, lamp N is energized by a circuit including front contact 242 of relay NCD, front contact 243 of relay HS and back contact 244 of relay TN. If standby apparatus is in use when an apparatus failure occurs during hand-stepping operations, lamp S is energized by a circuit including front contact 245 of relay SCD, front contact 243 of relay HS and front contact 244 of relay TN.

From the preceding descriptions of transfer operations it is evident that an apparatus failure in either the control code communication system or the indication code communication system is detected at the receiving end. A transfer occurs at the receiving end which affects the receivers of one system and the transmitters of the other. Since transmitters require time before they are ready for operation, simulated failure conditions are detected at the receiving end of the system in which the initial failure did not occur; transfers of apparatus are then effected at that end of the two systems. Thus, automatic transfers are performed without requiring the transmission of code cycles between stations to indicate transfers at one location and to call for transfers at the other. Since the transfer means causes the code communication systems to use either normally-used or standby apparatus exclusively, transfer operations are not complex and the searching for faulty apparatus can be confined to a particular group.

When hand-stepping operations are in progress, apparatus failures are not permitted to cause apparatus transfers until such manual operations are concluded.

The introduction of timing means (relays TE) into the transfer circuits provides a means for precluding the tying-up of system operations in the case of apparatus failures in both the normally-used and standby groups.

Figure 4:
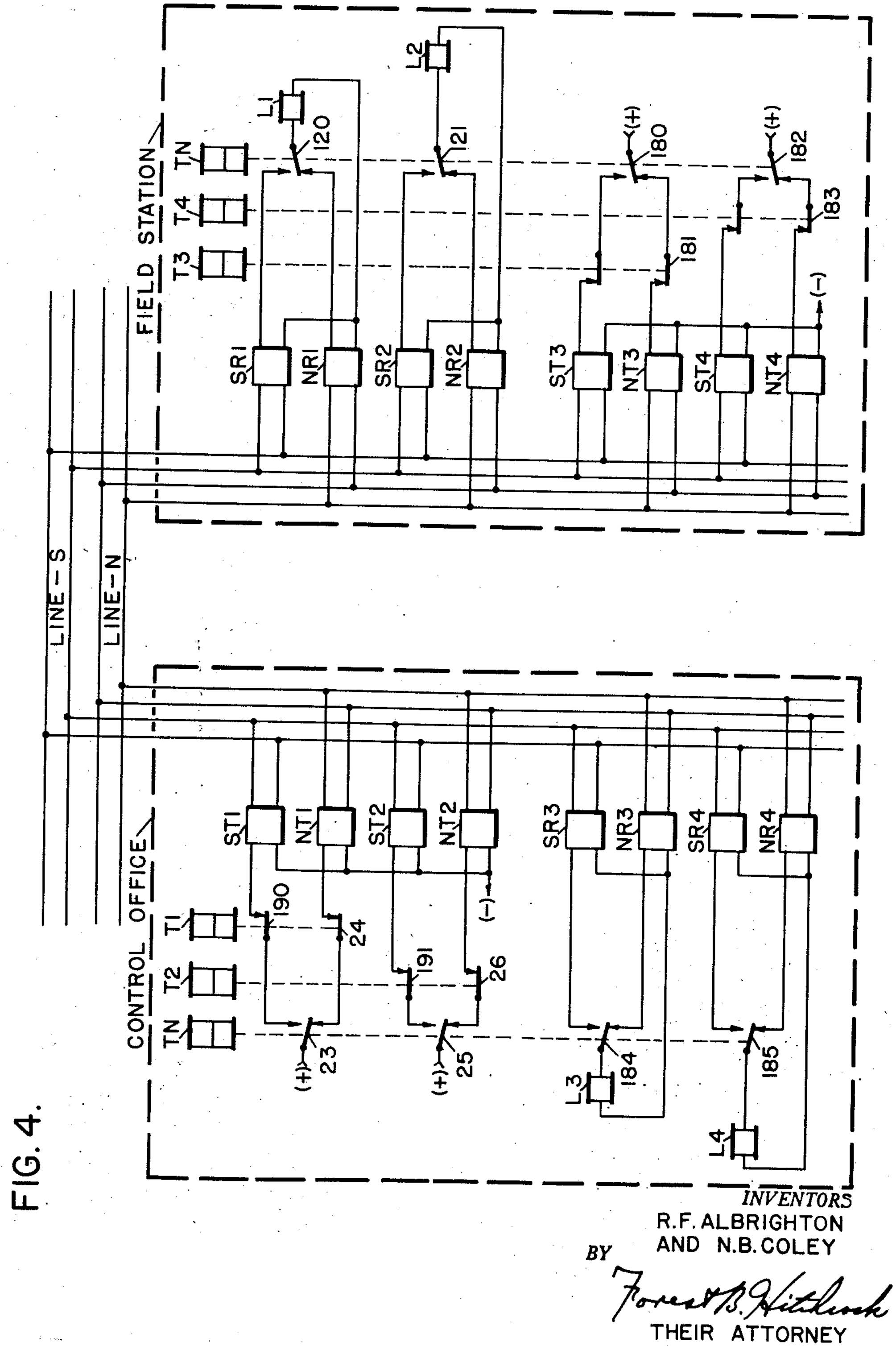
Fig. 4 shows diagrammatically further adaptations of the transfer means of the present invention for causing transfers between transmission lines and/or code communication apparatus.

The code communication systems previously described were assumed to use common transmission lines between the control office and the field station. No consideration was given to the possibility that system failures could be caused by line wire breaks rather than by apparatus failures. In Fig. 4 a modified code communication system is shown diagrammatically, in which normally-used apparatus corresponding to that previously described is connected to a normally-used line (line N) while standby apparatus is connected to a standby line (line S). Transfer operations, performed as previously described, then include transmission lines as well as transmitting apparatus.

Whenever a single transmission line circuit, as shown in Figs. 1A–1C, is employed unusual conditions may arise wherein a power or energy failure occurs at either the control office or the field station. Assume, for example, that the energy source for the control office relays fails or that the energy supply circuits are opened. The control code transmitters are deenergized resulting in the initiation of transfer operations at the field station as previously described. The timing relay TE at the field station operates causing successive alternate transfers between normally-used and standby apparatus; and such operations continue until control code energies are restored to the line circuit. When energy is restored at the control office either normally-used or standby apparatus may be operable at the field station. Therefore, it is possible that normally-used apparatus could be in service at the control office, while standby apparatus is in use at the field station, or conversely.

It is evident that the transfer means in the present invention is applicable to radio code communication systems which employ no line circuits, or to any other system which differs from that disclosed only insofar as the mode of energy transmission is concerned.

Having described an apparatus transfer means for code communication systems as one specific embodiment of the present invention, it is desired to be understood that this form is selected to facilitate in the disclosure of the invention rather than to limit the number of forms which it may assume; and it is to be further understood that various adaptations, modifications and alterations may be applied to the specific form shown to meet the requirements of practice, without in any manner departing from the spirit or scope of the present invention.

What we now claim is:

1. A two-way code communication system connecting two spaced stations comprising in combination, two communication channels connecting the stations, normally-at-rest carrier code communication apparatus at each station for communicating over said channels when initiated into respective cycles of operation, said carrier code communication apparatus being normally effective to energize both of said communication channels when the system is at rest, a standby carrier transmitter and a standby carrier receiver at each of the stations, and transfer means automatically effective at each station in response to abnormally sustained cessation of energization of one of said channels for rendering said standby carrier transmitters and carrier receivers effective at both stations for communicating over the respective communication channels.

2. In a two-way code communication system connecting two spaced stations, two communication channels connecting the stations, normally-at-rest carrier code communication apparatus at each station for communicating over said channels when initiated into respective cycles of operation, said code communication apparatus including a normally used carrier transmitter and a normally used carrier receiver respectively associated with the two channels at each station, said carrier transmitters at the two stations being effective to normally energize said communication channels respectively, a standby carrier transmitter and a standby carrier receiver at each of the stations, and transfer means automatically effective at each station in response to abnormally sustained cessation of energization of either of said channels for rendering said standby carrier transmitters and carrier receivers effective at both stations for communicating over the respective communication channels.

3. In a two-way code communication system connecting two remotely spaced stations, two communication channels connecting the stations, normally at rest code communication apparatus at each station for communication over said channels when initiated into respective cycles of operation, said code communication apparatus including a normally used transmitter and a normally used receiver respectively associated with the two communication channels at each station, said transmitters at the respective stations being effective to normally energize the communication channels respectively, a standby transmitter and a standby receiver at each of the stations, and transfer means automatically effective at each station in response to abnormally sustained cessation of energization of one of said channels for rendering said standby transmitter and receiver at that station effective for communication over the respective communication channels, said transfer means being operable when rendered effective at one station in response to cessation of energization of one channel for interrupting energization of the other channel and thereby initiating the rendering effective of the standby transmitter and receiver at the other station for communication over the respective channels.

4. In a two-way code communication system connecting two spaced stations, two communication channels connecting the stations, normally-at-rest code communication apparatus at each station for communicating over said channels when initiated into respective cycles of operation, said code communication apparatus including a normally used transmitter and a normally used receiver respectively associated with the two communication channels at each station, said transmitters at the respective stations being effective to normally energize the communication channels respectively, a standby transmitter and a standby receiver at each of the stations, transfer means automatically effective at each station in response to abnormal sustained cessation of energization of one of said channels for rendering said standby transmitter and receiver at that station effective for communication over the respective communication channels, said transfer means being operable when rendered effective at one station in response to cessation of energization of one channel to interrupt energization of the other channel and thereby initiate the rendering effective of the standby transmitter and receiver at the other station for communication over the respective channels, a timer at each of the stations subject to initiation upon the transfer means at the associated station being rendered effective, and means at each station responsive to completion of operation of said timer at the associated station for causing said normally used transmitter and said normally used receiver at the associated station to be rendered effective and said standby transmitter and said standby receiver at the associated station to be rendered ineffective.

5. In a two-way code communication system connecting two spaced stations, two communication channels connecting the stations, normally at rest code communication apparatus including a normally used carrier transmitter and a normally used carrier receiver at each of the stations, said carrier transmitters being normally effective to energize the respective communication channels, a standby carrier transmitter and a standby carrier receiver at each of the stations, transfer means automatically effective at each station in response to abnormally sustained cessation of energization of one of said channels for rendering said standby carrier transmitters and carrier receivers effective at both stations for communicating over the respective communication channels, a timer at each of the stations subject to initiation upon the transfer means at the associated station being rendered effective, and means at each of the stations responsive to the completion of operation of said timer at the associated station for rendering said normally used carrier transmitters and receivers effective and for rendering said standby transmitters and receivers ineffective.

6. A two-way code communication system connecting two stations comprising in combination, two communication channels connecting the stations, normally at rest code communication apparatus at each station for communicating over said channels when initiated into respective cycles of operation, said code communication apparatus including a normally used transmitter and a normally used receiver respectively associated with the two channels at each station, said transmitters at the two stations being effective to normally energize said communication channels respectively, a standby transmitter and a standby receiver at each station in response to abnormally sustained cessation of energization of either of said channels for rendering said standby transmitters and receivers effective at both stations for communicating over the respective communication channels, a timer at each of the stations subject to initiation upon the transfer means at the associated station being rendered effective, means at each of the stations responsive to the completion of operation of said timer at the associated station for rendering said normally used transmitters and receivers effective and for rendering said standby transmitters and receivers ineffective, and means for causing cessation of operation of said timers when both of the communication channels become simultaneously energized.

7. A two-way code communication system connecting two spaced stations comprising, two communication channels connecting the stations, normally at rest code communication apparatus at each station for communicating over said channels when initiated into respective cycles of operation, said code communication apparatus being normally effective to energize both of said communication channels when the system is at rest, manually operable means for hand-stepping said communication apparatus through a cycle of operation, a standby transmitter and a standby receiver at each of the stations, transfer means automatically effective at each station in response to abnormally sustained cessation of energization of one of said channels for rendering said standby transmitters and receivers effective at both stations for communicating over the respective communication channels, and means for rendering said transfer means ineffective in response to abnormally sustained cessation of energization of one of said channels provided that said manually operable means is in operation.

8. In a code communication system for communicating between two spaced stations, a communication channel connecting the two stations, normally-at-rest code communication apparatus operable when initiated to communicate by different series of selected code characters over said communication channel between the stations during respective cycles of operation, said code communication apparatus including a bank of stepping relays at each of the stations for counting the respective code characters during each cycle of operation, and circuit means for selectively operating said stepping relays through substantially all permutations of conditions of said relays during a single cycle of operation of the code communication system, said circuit means being effective to produce operation of but one relay to a selected picked up or dropped away position for any single code character, and circuit means for steadily energizing each of the relays at a potential below that required to actuate that relay to its picked up position, whereby the pick up and drop away times of relay operation are made to be substantially equal.

9. A code communication system for communicating between two spaced stations comprising, a communication channel connecting the two stations, code communication apparatus operable when initiated to communicate by different series of selected code characters over said communication channel between the stations during respective cycles of operation, a bank of stepping relays at each of the stations for counting the code characters of each cycle, said stepping relays having respectively operating and compensating windings, circuit means for selectively operating said stepping relays by the selective energization of said operating windings through substantially all permutations of conditions of said relays during each cycle of operation of the code communication system, and circuit means for steadily energizing said compensating windings of the relays at a potential below that required for the operation of the relays to their picked up positions, whereby the pick up and drop away times required for relay operation are made to be substantially equal.

10. In a code communication system for transmitting series of code energy pulses between two spaced stations, code transmitting means at one station capable when activated of transmitting code energies of particular characters, normally at rest stepping circuit means capable when activated of performing cyclical operations in which particular numbers of distinct steps are formed, cycle counting means associated with each operating cycle to be performed by said stepping circuit means, selection means operable to determine the characters of code energies to be transmitted, a plurality of step-forming networks selectively responsive to operations by said stepping circuit means and said cycle counting means for operating said code transmitting means in accordance with said selection means, circuit means for activating said stepping circuit means and said cycle counting means, circuit means responsive to operations by said stepping circuit means for operating said cycle counting means in a manner such that said cycle counting means is constantly effective in said step-forming networks, and circuit means responsive to operations by said cycle counting means for deactivating said stepping circuit means after the last of the predetermined number of cyclical stepping operations is performed.

11. In a code communication system for transmitting code energy pulses between two spaced stations, code transmitting means at one station operable to transmit code energies of selected characters, selection means for determining the characters of code energies to be transmitted, stepping circuit means including a bank of stepping relays, said stepping circuit means being normally at rest and being capable when activated of causing said stepping relays to perform cycles of stepping operations, each cycle comprising a particular number of steps, two cycle counting relays associated with each of a predetermined number of cycles of operation to be performed by said stepping relays, circuit means for activating said stepping circuit means, a plurality of step-forming networks including contacts of said stepping relays and said cycle counting relays for selectively energizing said code transmitting means in response to the condition of said selection means, circuit means responsive to operations by said stepping relays for operating said cycle counting relays in a manner such that each of the two cycle counting relays associated with a particular cycle is operated at a time when conditioning of said step-forming networks is independent of the condition of the particular cycle counting relay, and circuit means responsive to operations by the cycle counting relays associated with the last of the predetermined number of stepping cycles to be performed for deactivating said stepping circuit means upon the completion of said last cycle of operation.

12. In a code communication system for transmitting code energy pulses of selected characters between two spaced stations, a plurality of code transmitters at one station capable when activated of transmitting code energies of particular characters, selection means for determining the characters of code energies to be transmitted, stepping circuit means including a bank of stepping relays, said stepping circuit means being normally at rest and being capable when activated of performing cyclical operations wherein said stepping relays are operated in a particular sequence, an odd-numbered and an even-numbered cycle counting relay for detecting each cycle of operation by said bank of stepping relays, circuit means operable to activate said stepping circuit means, an odd-numbered step-forming network and an even-numbered step-forming network including contacts of said stepping relays and including, respectively, contacts of said odd-numbered and even-numbered cycle detection relays, said step-forming networks being capable of selectively energizing said code transmitters in accordance with said selection means, circuit means responsive to operations of said stepping relays for operating said cycle counting relays in a manner such that the odd-numbered cycle counting relay associated with each operating cycle is energized before the first odd-numbered step in that cycle and is deenergized after the last odd-numbered step, the even-numbered cycle counting relay associated with each operating cycle being energized before the first even-numbered step and being deenergized after the last even-numbered step, and circuit means responsive to operations of said cycle counting relays associated with the last of a predetermined number of stepping cycles for deactivating said stepping circuit means.

References Cited in the file of this patent

UNITED STATES PATENTS

| | | |
|---|---|---|
| 1,714,969 | White | May 28, 1929 |
| 2,135,295 | Stewart | Nov. 1, 1938 |
| 2,174,291 | Powell | Sept. 26, 1939 |
| 2,176,040 | Brixner | Oct. 10, 1939 |
| 2,459,494 | Brixner | Jan. 18, 1949 |
| 2,619,529 | Barker | Nov. 25, 1952 |
| 2,634,401 | Hill | Apr. 7, 1953 |